(12) United States Patent
Cordonier et al.

(10) Patent No.: US 8,445,118 B2
(45) Date of Patent: *May 21, 2013

(54) COATING LIQUID, METAL COMPOUND FILM FORMED BY COATING LIQUID, AND FORMING METHOD THEREOF

(75) Inventors: Christopher Cordonier, Aichi (JP); Tetsuya Shichi, Aichi (JP); Takafumi Numata, Aichi (JP); Kenichi Katsumata, Aichi (JP); Akimasa Nakamura, Aichi (JP); Yasuhiro Katsumata, Aichi (JP); Teruo Komine, Aichi (JP); Kenichirou Amemiya, Aichi (JP); Akira Fujishima, Aichi (JP); Makoto Yamashita, Aichi (JP)

(73) Assignee: Central Japan Railway Company, Nagoya (JP)

( * ) Notice: Subject to any disclaimer, the term of this patent is extended or adjusted under 35 U.S.C. 154(b) by 902 days.

This patent is subject to a terminal disclaimer.

(21) Appl. No.: 12/307,725

(22) PCT Filed: Jul. 12, 2007

(86) PCT No.: PCT/JP2007/063929
§ 371 (c)(1),
(2), (4) Date: Jan. 6, 2009

(87) PCT Pub. No.: WO2008/007751
PCT Pub. Date: Jan. 17, 2008

(65) Prior Publication Data
US 2009/0324963 A1    Dec. 31, 2009

(30) Foreign Application Priority Data

Jul. 13, 2006  (JP) ................. 2006-193415
Dec. 15, 2006  (JP) ................. 2006/325082
Dec. 25, 2006  (JP) ................. 2006/325783
Jan. 31, 2007  (JP) ................. 2007/051618

(51) Int. Cl.
*B32B 15/00* (2006.01)

(52) U.S. Cl.
USPC ............ 428/688; 428/457; 428/702; 428/704

(58) Field of Classification Search
USPC .................. 428/457, 704, 702, 688
See application file for complete search history.

(56) References Cited

U.S. PATENT DOCUMENTS

2004/0244648 A1  12/2004  Akui et al.
2005/0205165 A1   9/2005  Akui et al.
2011/0064913 A1*  3/2011  Takahashi et al. ............ 428/156

FOREIGN PATENT DOCUMENTS

JP     55167130 A    12/1980
JP     61044950 B    10/1986

(Continued)

OTHER PUBLICATIONS

Office Action dated Jan. 17, 2011, issued by the Korean Patent Office in corresponding Korean Application No. 2009-7002515 (with partial English translation).

(Continued)

*Primary Examiner* — Jennifer McNeil
*Assistant Examiner* — Lauren Colgan
(74) *Attorney, Agent, or Firm* — Kinney & Lange, P.A.

(57) ABSTRACT

A coating liquid including one or more of metal complexes selected from a metal complex A represented by Chemical Formula 1, a metal complex B represented by Chemical Formula 2, and a metal complex C represented by Chemical Formula 3. M in Formula 1, 2 and 3 represents a metal ion. Each of $X_1$-$X_4$ in Formula 1, 2 and 3 is one of O, NH, $CO_2$ and S. Each of $Y_1$-$Y_8$ in Formula 1 and $Y_1$-$Y_4$ in Formula 3 is either CH or N. Each of $Z_1$-$Z_3$ in Formula 2 and 3 and $Z_4$-$Z_6$ in Formula 2 is one selected from a group of O, NH and S, and two selected from a group of CH and N. L represents an axial ligand. k represents a valence of each of the metal complexes and is equal to a sum of electric charges of M, $X_1$-$X_4$ and L.

5 Claims, 16 Drawing Sheets

FOREIGN PATENT DOCUMENTS

| | | | |
|---|---|---|---|
| JP | 9248467 | A | 9/1997 |
| JP | 09-278489 | * | 10/1997 |
| JP | 9278489 | A | 10/1997 |
| JP | 11-228113 | * | 8/1999 |
| JP | 11228113 | A | 8/1999 |
| JP | 11-256342 | * | 9/1999 |
| JP | 11256342 | A | 9/1999 |
| JP | 2000264893 | A | 9/2000 |
| JP | 2001261378 | A | 9/2001 |
| JP | 2003112949 | A | 4/2003 |
| JP | 2003261330 | A | 9/2003 |
| JP | 2003267733 | A | 9/2003 |
| JP | 2005054116 | A | 3/2005 |
| JP | 2005060304 | A | 3/2005 |
| WO | WO03037996 | A1 | 5/2003 |

OTHER PUBLICATIONS

Chi et al., Structural characterization of Sr-Ti and Ba-Ti catecholate complexes: single source precursors for SrTiO3 and BaTiO3 binary oxides, Journal of Physics and Chemistry of Solids 62 (2001).

Honda et al., Control of Hydrolysis and Condensation Reactions of Titanium tert-butoxide by Chemical Modification with Catechol, Journal of Sol-Gel Science and Technology 22, 133-138, 2001.

Office Action of the Japanese Patent Office in corresponding Japanese Application No. 2008-524846, dated Apr. 3, 2012.

Office Action of the Chinese Patent Office dated Nov. 14, 2012, in corresponding application No. 200780026521.2.

Office Action of the Taiwan Patent Office dated Aug. 15, 2012 in corresponding application No. 096125367.

* cited by examiner

COATING LIQUID A, 500°C FIRING CONDITION

500°C THICK FILM CONDITION

60 μm     ELECTRON MICROSCOPE IMAGE 1

FULL SCALE 347    COUNT CURSOR : 0.000 keV    keV

DETECTION RESULT OF WHITE PORTION

SPECTRUM PROCESSING: NO PEAK IS OMITTED

PROCESSING OPTION: ALL ELEMENTS WERE ANALYZED(NORMALIZED)
REPEAT COUNT=4

STANDARD :
C   CaCO3   1999/06/01
O   SiO2   1999/06/01
Si   SiO2   1999/06/01

| ELEMENT | MASS CONCENTRATION [%] | ATOM NUMBER CONCENTRATION [%] |
|---|---|---|
| C K | 51.15 | 70.40 |
| O K | 1.90 | 1.96 |
| Si K | 46.95 | 27.63 |
| TOTAL | 100.00 | |

DETECTION RESULT OF BLACK PORTION

SPECTRUM PROCESSING: NO PEAK IS OMITTED

PROCESSING OPTION: ALL ELEMENTS WERE ANALYZED(NORMALIZED)
REPEAT COUNT=3
STANDARD :
C   CaCO3   1999/06/01
O   SiO2    1999/06/01
Al  Al2O3   1999/06/01
Si  SiO2    1999/06/01

| ELEMENT | MASS CONCENTRATION [%] | ATOM NUMBER CONCENTRATION [%] |
|---|---|---|
| C K | 39.89 | 58.50 |
| O K | 7.92 | 8.72 |
| Al K | 1.89 | 1.24 |
| Si K | 50.29 | 31.54 |
| TOTAL | 100.00 | |

ELECTRON MICROSCOPE IMAGE 1

DETECTION RESULT OF SELECTED AREA

SPECTRUM PROCESSING: NO PEAK IS OMITTED

PROCESSING OPTION: ALL ELEMENTS WERE ANALYZED(NORMALIZED)
REPEAT COUNT=2

STANDARD :
C   CaCO3   1999/06/01
O   SiO2    1999/06/01
Al  Al2O3   1999/06/01
Si  SiO2    1999/06/01

| ELEMENT | MASS CONCENTRATION [%] | ATOM NUMBER CONCENTRATION [%] |
|---|---|---|
| C K | 10.03 | 19.84 |
| O K | 6.28 | 9.33 |
| Al K | 1.53 | 1.35 |
| Si K | 82.15 | 69.48 |
| TOTAL | 100.00 | |

ELECTRON MICROSCOPE IMAGE 1

DETECTION RESULT OF SELECTED AREA

SPECTRUM PROCESSING: NO PEAK IS OMITTED

PROCESSING OPTION: ALL ELEMENTS WERE ANALYZED(NORMALIZED)
REPEAT COUNT=2

STANDARD :
O   $SiO_2$   1999/06/01
Al  $Al_2O_3$ 1999/06/01
Si  $SiO_2$   1999/06/01

| ELEMENT | MASS CONCENTRATION [%] | ATOM NUMBER CONCENTRATION [%] |
|---|---|---|
| O K | 17.74 | 26.74 |
| Al K | 75.22 | 67.22 |
| Si K | 7.04 | 6.04 |
| TOTAL | 100.00 | |

DETECTION RESULT OF BLACK PORTION

SPECTRUM PROCESSING: NO PEAK IS OMITTED

PROCESSING OPTION: ALL ELEMENTS WERE ANALYZED(NORMALIZED)
REPEAT COUNT=2

STANDARD :
O   SiO2   1999/06/01
Al  Al2O3  1999/06/01
Si  SiO2   1999/06/01

| ELEMENT | MASS CONCENTRATION [%] | ATOM NUMBER CONCENTRATION [%] |
|---|---|---|
| O K | 12.74 | 20.37 |
| Al K | 4.57 | 4.33 |
| Si K | 82.69 | 75.30 |
| TOTAL | 100.00 | |

DETECTION RESULT OF WHITE PORTION

SPECTRUM PROCESSING: NO PEAK IS OMITTED

PROCESSING OPTION: ALL ELEMENTS WERE ANALYZED(NORMALIZED)
REPEAT COUNT=1

STANDARD :
 Si   SiO2   1999/06/01

| ELEMENT | MASS CONCENTRATION [%] | ATOM NUMBER CONCENTRATION [%] |
|---|---|---|
| Si K | 100.00 | 100.00 |
| TOTAL | 100.00 | |

DETECTION RESULT OF SELECTED PORTION

SPECTRUM PROCESSING: NO PEAK IS OMITTED

PROCESSING OPTION: ALL ELEMENTS WERE ANALYZED(NORMALIZED)
REPEAT COUNT=2

STANDARD :
O   SiO2   1999/06/01
Al   Al2O3   1999/06/01
Si   SiO2   1999/06/01

| ELEMENT | MASS CONCENTRATION [%] | ATOM NUMBER CONCENTRATION [%] |
|---|---|---|
| O K | 13.38 | 21.29 |
| Al K | 5.15 | 4.86 |
| Si K | 81.47 | 73.85 |
| TOTAL | 100.00 | |

DETECTION RESULT OF SELECTED PORTION

SPECTRUM PROCESSING: NO PEAK IS OMITTED

PROCESSING OPTION: ALL ELEMENTS WERE ANALYZED(NORMALIZED)
REPEAT COUNT=1

STANDARD :
 Si   SiO2   1999/06/01

| ELEMENT | MASS CONCENTRATION [%] | ATOM NUMBER CONCENTRATION [%] |
|---|---|---|
| Si K | 100.00 | 100.00 |
| TOTAL | 100.00 | |

DETECTION RESULT OF SELECTED PORTION (WHITE)

SPECTRUM PROCESSING: NO PEAK IS OMITTED

PROCESSING OPTION: ALL ELEMENTS WERE ANALYZED(NORMALIZED)
REPEAT COUNT=2

STANDARD :
C  CaCO3  1999/06/01
O  SiO2   1999/06/01
Al Al2O3  1999/06/01

| ELEMENT | MASS CONCENTRATION [%] | ATOM NUMBER CONCENTRATION [%] |
|---|---|---|
| C K | 8.53 | 16.20 |
| O K | 11.23 | 16.00 |
| Al K | 80.24 | 67.80 |
| TOTAL | 100.00 | |

DETECTION RESULT OF SELECTED PORTION (BLACK)
SPECTRUM PROCESSING: NO PEAK IS OMITTED

PROCESSING OPTION: ALL ELEMENTS WERE ANALYZED(NORMALIZED)
REPEAT COUNT=3

STANDARD :
C  CaCO3  1999/06/01
O  SiO2   1999/06/01
Al Al2O3  1999/06/01
Si SiO2   1999/06/01

| ELEMENT | MASS CONCENTRATION [%] | ATOM NUMBER CONCENTRATION [%] |
|---|---|---|
| C K | 16.00 | 26.62 |
| O K | 22.20 | 27.73 |
| Al K | 57.94 | 42.91 |
| Si K | 3.86 | 2.75 |
| TOTAL | 100.00 | |

COATING LIQUID, METAL COMPOUND FILM FORMED BY COATING LIQUID, AND FORMING METHOD THEREOF

TECHNICAL FIELD

The present invention is related to a coating liquid used for forming a metal compound film, a metal compound film, a forming method thereof, and a product having a metal compound film formed on a surface of the product.

BACKGROUND ART

The dry method such as sputtering, physical vapor deposition (PVD), chemical vapor deposition (CVD), and so on, and the wet method as typified by sol-gel method are known as techniques for forming a metal oxide film on a surface of glass, metal, ceramics and other substrates.

However, the dry process by the physics method such as sputtering, PVD and so on necessitates high degree of vacuum. Maintaining such high vacuum becomes more difficult as a device becomes larger. Therefore, forming a metal oxide film over a large dimension is difficult. Moreover, a large quantity of energy is required so as to vaporize the materials, and an enormous quantity of energy is additionally required since base plates, on which metal oxide films are formed, must be also heated so as to improve the quality of film formation. Furthermore, in a case wherein a base plate has a complex shape, film formation is difficult in a "shadow" portion of the base plate.

Still furthermore, CVD involves chemical reaction, which makes difficult to maintain uniform composition of a film and requires control of by-products. Therefore, extremely complicated control is required.

Also, in sol-gel method, since the progress of a condensation polymerization reaction is remarkably different depending on a temperature and humidity, strict control on film forming conditions becomes necessary in order to constantly obtain uniform films. Moreover, since the sol of a coating liquid is often unstable, there are many problems to be solved in an actual use, and some design is needed in order to maintain the viscosity of the sol and to prevent sedimentation of solid particles. Furthermore, there are cases in which exhibition of a specific function in a metal oxide film is desired by adding two or more kinds of metal species to a metal oxide film. In sol-gel method, however, since hydrolysis rate is different depending on the metal species, phase separation is caused even if dissimilar metals are mixed. Thus, it is unable to exhibit such a function.

Thus, a technique is proposed for applying a coating liquid including metal complexes to a surface of a metal plate, and thereafter firing to thermally decompose the metal complexes to form a metal oxide film (see Patent Documents 1-3). In this technique, multidentate ligands including two or more substituents such as an amino group, a hydroxyl group and others, like etylenediaminetetraacetate, diethanolamine, acetylacetone and so on, in the molecule are frequently used as ligands of metal complexes.

Patent Document 1: Unexamined Japanese Patent Publication No. 9-278489
Patent Document 2: Unexamined Japanese Patent Publication No. 11-228113
Patent Document 3: Unexamined Japanese Patent Publication No. 11-256342

DISCLOSURE OF THE INVENTION

Problems to be Solved by the Invention

In the conventional forming method of a metal oxide film using a coating liquid including metal complexes, when the metal complexes are decomposed by heat after a film is formed, ligands as organic substance are lost. Significant volume contraction of the film is caused, and thus, there are problems in that cracks are formed on the metal oxide film and adhesion between the metal oxide film and a base plate becomes deteriorated. The problems regarding cracks and the poor adhesion become more significant especially as the metal oxide film becomes thicker.

The present invention is made in consideration of the above issues. The purpose is to provide a coating liquid by which high quality metal compound films can be formed where cracks or poor adhesion between a metal compound film (metal oxide film, for example) and a base plate are not caused. The purpose is also to provide a method for forming such metal compound film, a metal compound film, and a product covered by such metal compound film.

Means for Solving the Problem

A first invention of the present application is related to a coating liquid including one or more of metal complexes selected from a metal complex A represented by Chemical Formula 1, a metal complex B represented by Chemical Formula 2, and a metal complex C represented by Chemical Formula 3.

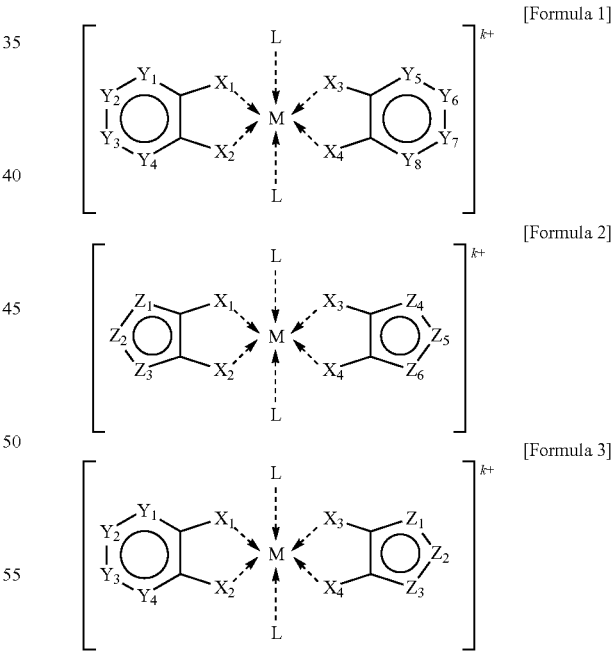

M in Chemical Formula 1, Chemical Formula 2 and Chemical Formula 3 represents a metal ion. Each of $X_1$-$X_4$ in Chemical Formula 1, Chemical Formula 2 and Chemical Formula 3 is one of O, NH, $CO_2$ and S. Each of $Y_1$-$Y_8$ in Chemical Formula 1 and $Y_1$-$Y_4$ in Chemical Formula 3 is either CH or N. Each of $Z_1$-$Z_3$ in Chemical Formula 2 and Chemical Formula 3 and $Z_4$-$Z_6$ in Chemical Formula 2 is one selected from a group consisting of O, NH and S, and two selected from a group consisting of CH and N. L in Chemical Formula 1, Chemical Formula 2 and Chemical Formula 3 represents an axial ligand. L, for example, may be an anion such as alkoxide ion, hydroxide ion and halide ion, or a molecule which coordinate to metal such as water, alcohols and amines. k in Chemical Formula 1, Chemical Formula 2 and Chemical Formula 3 represents a valence of each of the metal complexes and is equal to a sum of electric charges of M, $X_1$-$X_4$ and L.

The coating liquid according to the present invention can be a coating liquid including the metal complex A, a coating liquid including the metal complex B, a coating liquid including the metal complex C, and coating liquids including two or more of the metal complexes A-C.

By using the coating liquid according to the present invention, a metal compound film can be formed on a surface of a base plate. For example, when the coating liquid according to the present invention is applied on a surface of a base plate and dried, a film including the metal complex A, the metal complex B, the metal complex C or two or more of the foregoing metal complexes is formed on the surface of the base plate. Subsequently, when the film is fired, the above-described organic metal complexes are decomposed by heat, ligands are lost, and a film made of metal M compound expressed by chemical Formula 18 is formed. The metal M compound differs in kinds of $X_5$ and $X_6$ in Chemical Formula 18 ($X_5$ and $X_6$ are one of O, N and S included in $X_1$-$X_4$). For example, if both $X_5$ and $X_6$ are O, the metal M compound becomes a metal M oxide. Both $X_5$ and $X_6$ can be S, N, or any of the two selected from O, S and N.

A metal compound film formed by using the coating liquid according to the present invention does not have cracks formed thereon, and has an excellent adhesion to a base plate. Moreover, because cracks are not formed, the thickness of a metal compound film can be increased.

The reason why cracks are not formed as described above can be assumed as follows. That is, each of the metal complexes A-C has a flat structure as clear from the molecular structure represented in each of Chemical Formulae 1-3. Thus, when the coating liquid is applied on a base plate and a film is formed, due to an interaction among the metal complex molecules, a molecular assembly (stacking) is formed such that the metal complexes are overlapped with one another. Moreover, an interaction among aromatic rings included in the ligands contributes to the formation of the above-described molecular assembly. Therefore, even if the ligands are lost during firing, contraction in the volume in a direction parallel to the surface of a base plate is assumed to be inhibited, and occurrence of cracks and exfoliation is therefore assumed to be inhibited.

The reason why cracks and poor adhesion are caused when a metallic oxide film is formed by conventionally used metal complexes can be considered as follows. When a metallic atom forms a complex, bonds are formed through an outmost d-orbit. The bonds extend toward respective vertexes of a regular octahedron, wherein the metallic atom is positioned in the center, and a substitution group of the ligand exists on each of leading edges of the bond. Thus, an ordinary organic metal complex has a three-dimensional structure having a metal in the center, such as the molecule structure shown in FIG. 8. Consequently, when a film, made of organic metal complexes, is fired, and the ligands are lost by thermal decomposition, a large contraction in the volume in three-dimensional space is caused. As a result, cracks and exfoliation are caused due to loss of matching in the size of a base plate and the size of a film.

Moreover, a metal compound film formed by using the coating liquid according to the present invention has a high degree of hardness. Furthermore, a metal compound film formed by using the coating liquid according to the present invention is flat, smooth, and has high transparency. Therefore, in a case, for example, wherein a metal compound film is formed on the surface of glass, the transparency of the glass can be maintained. In a case wherein a metal compound film is formed on the surface of a mirror, the reflectivity of the mirror can be maintained.

Furthermore, the coating liquid according to the present invention can form a metal compound film having durability even though the coating liquid does not contain a binder. Since the concentration of metal compound, contained in the formed film, is not diluted by a binder, the effect of metal compound (for example, photocatalytic effect) is high.

Still furthermore, since the coating liquid according to the present invention is stable, the coating liquid can be preserved for a long term.

As for the M, for example, Al, Si, Ti, V, Cr, Mn, Fe, Co, Ni, Cu, Zn, Ga, Zr, Nb, In, Sn, Eu, Ta, Pb and others can be used. The M can be a single kind of metal or two or more kinds of metal can be mixed.

If Ti is used for the M, a film of a metal compound (a compound in which M is replaced with Ti in Chemical Formula 18) formed using the coating liquid according to the present invention exhibits photocatalytic effect. Here, if both $X_5$ and $X_6$ are O (in the case of $TiO_2$), the photocatalytic effect is exhibited in the wavelength range of ultraviolet radiation. If at least one of $X_5$ and $X_6$ is S or N, photocatalytic effect is exhibited in a different wavelength range (for example, a range of visible light).

If a combination of In and Sn, a combination of Ga and Zn or a combination of Nb and Ti is used for the M and O is used for both $X_5$ and $X_6$, the metal oxide film formed using a coating liquid of the present invention (ITO, Ga—ZnO or Nb—$TiO_2$) functions as a transparent conductive film.

If Sn is used for the M and O is used for both $X_5$ and $X_6$, the film formed using a coating liquid of the present invention ($SnO_2$) exhibits heat ray blocking effect as a Low-E film. If V is used for the M and O is used for both $X_5$ and $X_6$ and a metal oxide film ($V_2O_5$) using the coating liquid of the present invention is formed on a glass surface, a light control glass can be produced.

If Nb is used for the M, a metal oxide film formed by using a coating liquid of the present invention exhibits super-hydrophilicity.

The metal complex A can be one of metal complexes, for example, represented by Chemical Formulae 4-11.

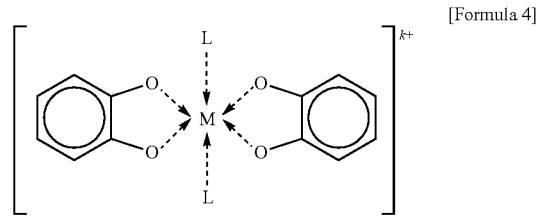

[Formula 4]

-continued

[Formula 5]
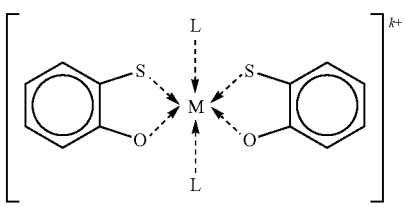

[Formula 6]
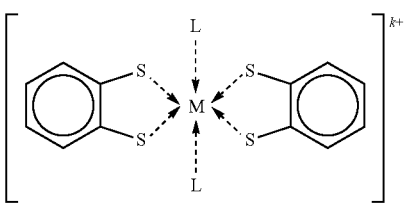

[Formula 7]
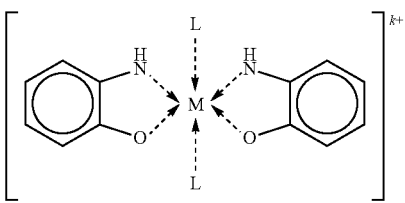

[Formula 8]
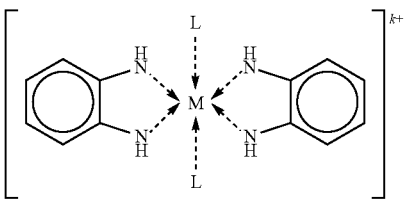

[Formula 9]
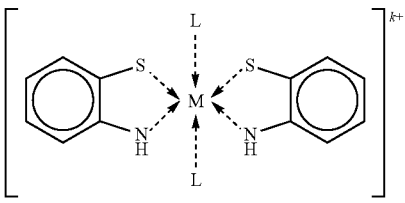

[Formula 10]
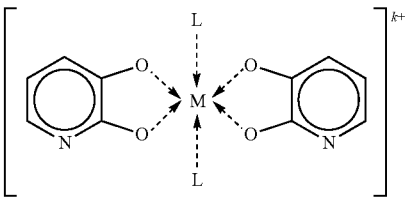

[Formula 11]
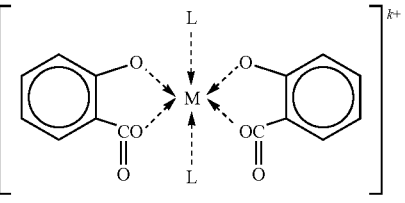

In the above-described Chemical Formula 4, S is used for $X_1$ and $X_3$ and O is used for $X_2$ and $X_4$. Aside from this, S may be used for $X_1$ and $X_4$ and O for $X_2$ and $X_3$, S may be used for $X_1$ and $X_2$ and O for $X_3$ and $X_4$, S may be used for only one of $X_1$-$X_4$ and O for others, or O may be used for only one of $X_1$-$X_4$ and S for others. Similarly, in Chemical Formulae 7, 9 and 11 as well, the combination of $X_1$-$X_4$ may be changed as above.

In Chemical Formula 10, N is used for $Y_4$ and $Y_8$ and CH for $Y_1$-$Y_3$ and $Y_5$-$Y_7$. Aside from this, N may be used for $Y_1$ and $Y_8$ and CH may be used for $Y_1$-$Y_7$.

The metal complex B can be one of metal complexes, for example, represented by Chemical Formulae 12-15.

[Formula 12]
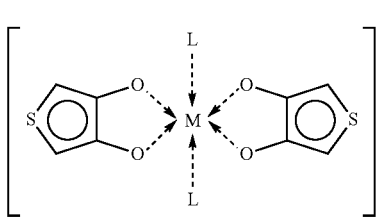

[Formula 13]
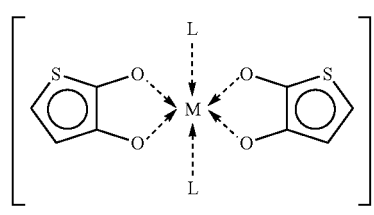

[Formula 14]
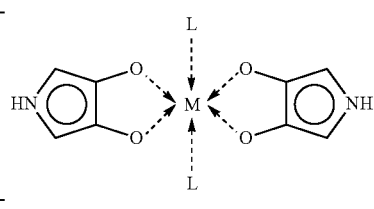

[Formula 15]
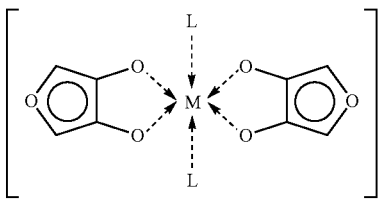

In Chemical Formula 13, S is used for $Z_1$ and $Z_4$ and CH for $Z_2$-$Z_3$ and $Z_5$-$Z_6$. Aside from this, S may be used for $Z_1$ and $Z_6$ and CH for $Z_2$-$Z_5$.

The metal complex C can be one of metal complexes, for example, represented by Chemical Formulae 16-17.

[Formula 16]
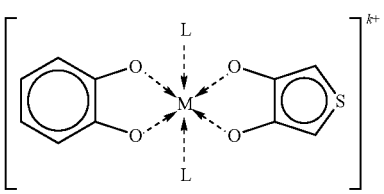

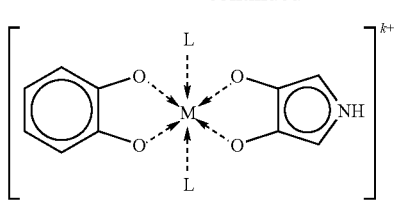
[Formula 17]

The coating liquid according to the present invention can be easily produced. For example, the coating liquid can be made merely by adding, in a suitable solvent, two molar equivalent of an ingredient, which becomes a ligand, to basic ingredients, such as metal alkoxide, metal salt (for example metal chloride), and so on, heating the ingredients so as to produce a metal complex A and/or a metal complex B, and performing filtering/recovering if necessary. Or, the coating liquid can be made merely by adding, in a suitable solvent, one molar equivalent of two ingredients, which become two types of ligands, to basic ingredients, such as metal alkoxide, metal salt (for example) metal chloride, and so on, heating the ingredients so as to produce a metal complex C, and performing separation/refining if necessary. In producing the metal complexes A-C, the ingredient which becomes the ligands is a 1,2-substituted aromatic compound. In the case of the metal complex A represented by Chemical Formula 4, the ingredient is catechol (Chemical Formula 19). In the case of the metal complex A represented by each of Chemical Formulae 5-11, the ingredient is a compound represented by each of Chemical Formulae 20-26. In the case of the metal complex B represented by each of Chemical Formulae 12-15, the ingredient is a compound represented by each of Chemical Formulae 27-30, respectively. In the case of the metal complex C represented by Chemical Formula 16, the ingredient is a combination of catechol (Chemical Formula 19) and a compound represented by Chemical Formula 27. In the case of the metal complex C represented by Chemical Formula 17, the ingredient is a combination of catechol (Chemical Formula 19) and a compound represented by Chemical Formula 29.

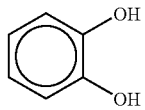
[Formula 19]

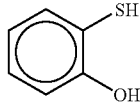
[Formula 20]

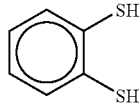
[Formula 21]

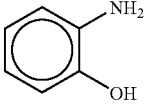
[Formula 22]

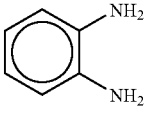
[Formula 23]

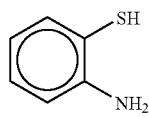
[Formula 24]

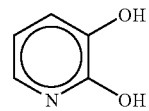
[Formula 25]

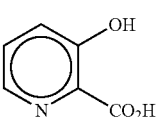
[Formula 26]

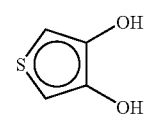
[Formula 27]

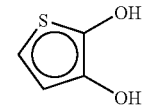
[Formula 28]

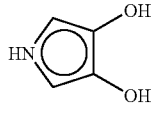
[Formula 29]

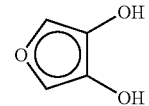
[Formula 30]

The coating liquid according to the present invention can include, as the solvent, for example, alcohol (such as 2-propanol, methanol, ethanol, n-butanol), ether (such as diethyl ether, MTBE, THF, and so on), hydrocarbon (such as octane, n-hexane, cyclohexane, benzene, toluene, xylene, and so on), dimethylsulfoxide, dimethylformamide, halide (chloroform, dibromomethane, dichloromethane, and so on), ketone (acetone, methyl ethyl ketone (MEK), AcAc, and so on), acetic ethyl, water, and so on.

Although the concentration of metal complexes in the coating liquid is not specifically limited, as long as the concentration does not exceed the solubility of organic metal complexes. The concentration is preferably, for example, 0.1-5% by weight. Upon forming a composite metal compound film in which two or more kinds of metals are uniformly mixed, corresponding metal complexes may be mixed at a desired proportion.

A second invention of the present application is related to a method for forming a metal compound film including steps of applying the coating liquid, according to the above-described first invention, on a base plate so as to form a film, and changing one or more of metal complexes selected from a group consisting of the metal complex A, the metal complex B and the metal complex C included in the film, into a metal compound represented by Chemical Formula 18.

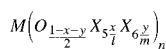
[Formula 18]

Each of $X_5$ and $X_6$ in Chemical Formula 18 is one of O, N and S included in $X_1$-$X_4$. l, m and n are valences of $X_5$, $X_6$ and M, respectively. Also, each of x and y corresponds to each content percentage of $X_5$ and $X_6$ in the aforementioned metal compound, a sum of which is not larger than 1.

A metal compound film formed according to the present invention does not have cracks formed thereon, and has an excellent adhesion to a base plate. Moreover, because cracks are not formed as described above, the thickness of a metal compound film can be increased.

Moreover, a metal compound film formed according to the present invention is flat, smooth, and has high transparency. Therefore, in a case, for example, wherein a metal compound film is formed on the surface of glass, the transparency of the glass can be maintained. In a case wherein a metal compound film is formed on the surface of a mirror, the reflectivity of the mirror can be maintained.

Furthermore, the coating liquid used in the present invention can form a metal compound film having durability even though the coating liquid does not contain a binder. Since the concentration of metal compound, contained in the formed film, is not diluted by a binder, the effect of metal compound (for example, photocatalytic effect in the wavelength range of ultraviolet radiation) is high. Specifically, if the metal compound is a Nb compound, the metal compound film is substantially super-hydrophilic. Also, if the metal compound is a Ti compound and any of $X_1$-$X_4$ in the chemical formula (one of Chemical Formulae 1-3) of the metal compound is NH or S, the metal compound film is a photocatalyst responsive to visible light.

The aforementioned base plate is not specifically limited, but is desirably made of a substance which is tolerant to the temperature at firing, if firing is employed during the process of changing the metal complexes A-C to the metal compound represented by Chemical Formula 18. For the base plate, for example, glass (such as PYREX (registered trademark) glass, soda glass, quartz glass), metal (such as iron, stainless steel, aluminum, copper, brass and so on), ceramics (such as alumina, zirconia, silica), and heat-resistant macromolecule of resin (such as polyimide resin and the like) can be used.

Various methods can be used for the application of the coating liquid, as long as films can be formed by the method. Generally used coating methods, for example, spin coat, dip coat, spray coat methods and so on, may be used. Subsequent to the application of the coating liquid, films are preferably naturally dried at normal temperatures and normal pressures. Thereafter, firing of the films, for example, may be performed.

In order to change the metal complexes A-C into the metal compound represented by Chemical Formula 18, there is a method, for example, wherein the coating liquid is applied and a formed film is fired. The firing temperature is preferable to be in a range of 250-1800° C. If the firing temperature is 250° C. or higher, a film which is harder and denser can be formed. As described above, since the firing temperature can be a low temperature in the range of 250° C., a metal compound film can be formed on the surface of a base plate which is not resistant to heat by using the coating liquid of the present invention. Also, even if the base plate is soda glass, a metal compound film can be formed without undercoat. The firing temperature may be adjusted depending on the kind of the metal M and a desired crystalline phase of a metal compound film.

A third invention of the present application is related to a titanium oxide film formed by the method for forming a metal compound film according to the above-described second invention.

A metal compound film according to the present invention does not have cracks formed thereon, has an excellent adhesion to a base plate, and has high degree of hardness. Moreover, the metal compound film according to the present invention is flat, smooth, and has high transparency. Therefore, in a case, for example, wherein the metal compound film is formed on the surface of glass, the transparency of the glass can be maintained. In a case wherein the metal compound film is formed on the surface of a mirror, the reflectivity of the mirror can be maintained. Furthermore, since the metal compound film according to the present invention does not have to contain a binder, the concentration of metal compound, contained in the formed film, is not diluted by a binder, and the effect of metal compound (for example, photocatalytic effect) is high. Specifically, if the metal compound is a Nb compound, the metal compound film is substantially super-hydrophilic. Also, if the metal compound is a Ti compound and any of $X_1$-$X_4$ in the chemical formula (any of Chemical Formulae 1-3) of the metal compound is NH or S, the metal compound film is a photocatalyst responsive to visible light.

A fourth invention of the present application is related to a metal compound film covered product including a base plate, and a metal compound film formed on a surface of the base plate by the method for forming a metal compound film according to the above-described second invention.

In the metal compound film covered product according to the present invention, the metal compound film does not have cracks formed thereon, has an excellent adhesion to a base plate, and has high degree of hardness. Moreover, the metal compound film according to the present invention is flat, smooth, and has high transparency. Therefore, in a case, for example, wherein the metal compound film is formed on the surface of glass, the transparency of the glass can be maintained. In a case wherein the metal compound film is formed on the surface of a mirror, the reflectivity of the mirror can be maintained. Furthermore, since the metal compound film according to the present invention does not have to contain a binder, the concentration of metal compound, contained in the formed film, is not diluted by a binder, and the effect of metal compound (for example, photocatalytic effect) is high. Specifically, if the metal compound is a Nb compound, the metal compound film is substantially super-hydrophilic. Also, if the metal compound is a Ti compound and any of $X_1$-$X_4$ in the chemical formula (any of Chemical Formulae 1-3) of the metal compound is NH or S, the metal compound film is a photocatalyst responsive to visible light.

The aforementioned base plate is not specifically limited, but is desirably made of a substance which is tolerant to the temperature at firing, if firing is employed during the process of changing the metal complexes A-C to the metal compound represented by Chemical Formula 18. For the base plate, for example, glass (such as PYREX (registered trademark) glass, soda glass, quartz glass), metal (such as iron, stainless steel, aluminum, copper, brass and so on), ceramics (such as alumina, zirconia, silica), and heat-resistant macromolecule of resin (such as polyimide resin and the like) can be used.

DETAILED DESCRIPTION OF PREFERRED EMBODIMENTS OF THE INVENTION

Figure 1:
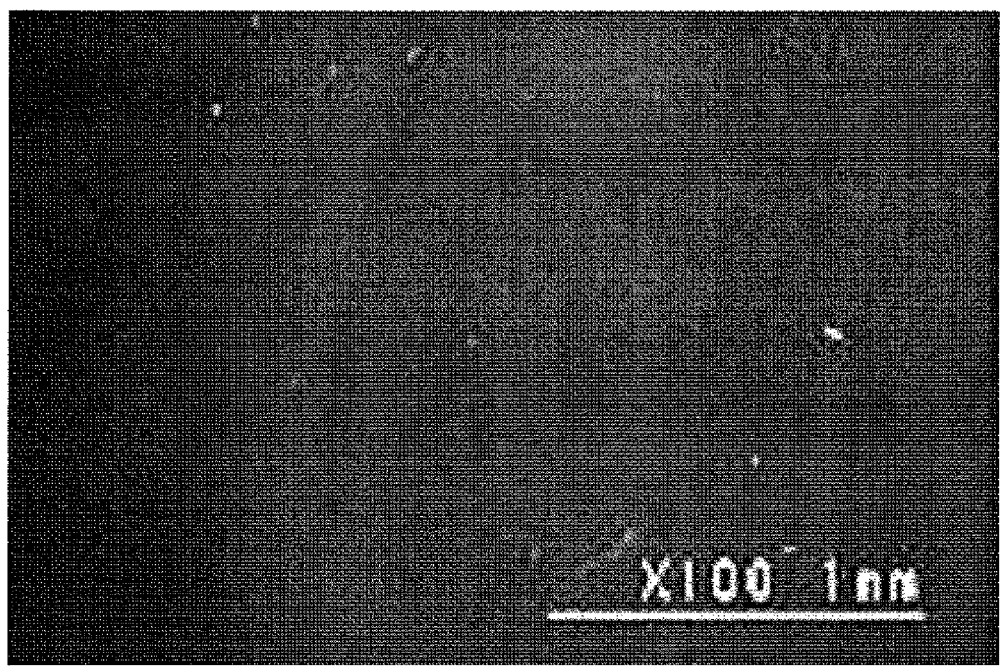
FIG. 1 is a microscope image showing a surface of a metal oxide film.
Figure 1:
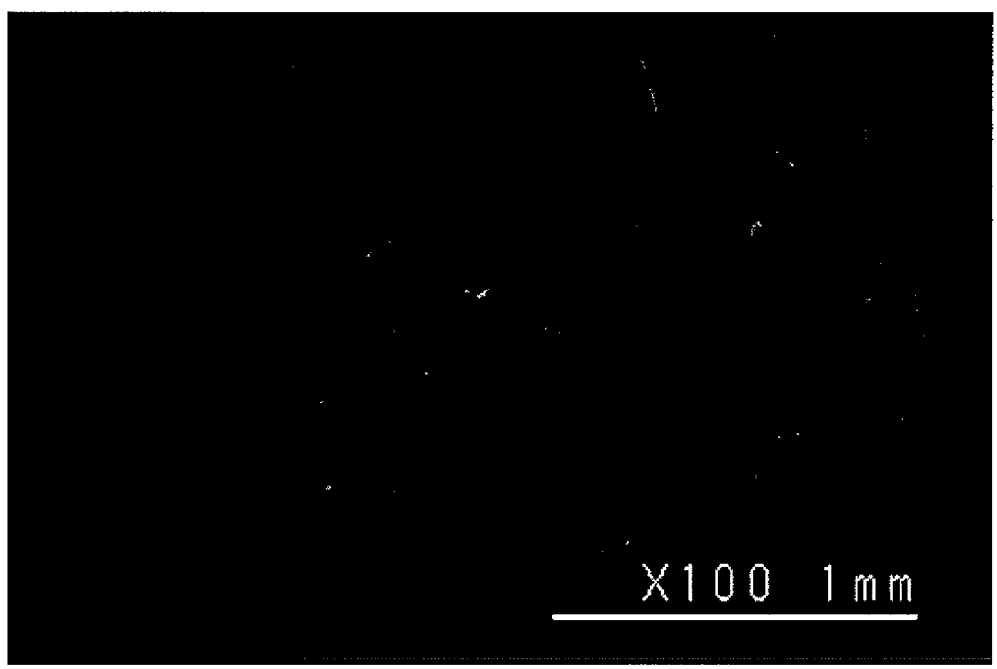

The present invention is described based on embodiments.

Embodiment 1

(a) Producing Coating Liquids

A solution was prepared wherein catechol was dissolved in a suitable amount of xylene. To the solution, titanium(IV) isopropoxide were added as much as the mol ratio of titanium (IV) isopropoxide (titanium(IV) isopropoxide) and catechol became 1:2, and blended. The above-described compound liquid was refluxed approximately for 1 hour, and then distilled until the temperature of steam became 140° C. After the distillation, residual mixture was left overnight at room temperature, and precipitate formed therefrom was filtered by using a membrane suction filter. Subsequently, the filtered solid was placed in vacuum at 140° C. so as to remove volatile component, and dried. The drying was continued until the amount of the solid became a value (approximately 98%) close to a theoretical value. The obtained solid was titanium catecholate.

Subsequently, 1 g of the above-described titanium catecholate (3.79 mmol in terms of titanium catecholate) was dissolved into 100 ml of compound liquid wherein acetylacetone and acetone were blended in the volume ratio of 1:14. Then, Coating Liquid A was completed.

Additionally, in order to form a thick film, 1.32 g of the above-described titanium catecholate (5.0 mmol in terms of titanium catecholate) was dissolved into 10 ml of compound liquid wherein acetylacetone and benzene were blended in the volume ratio of 1:1. Then, Coating Liquid B was completed.

(b) Forming Metal Oxide Films on Surfaces of Glass Base Plates

Coating Liquid A produced in the above-described (a) was applied onto the surface of each base plate made of PYREX (registered trademark) glass in the size of 50 mm×50 mm by the spin coat method so as to form a film. The rotation speed used in the spin coat method was 1000 rpm, the coating time was 30 seconds, and the dropping amount of the coating liquid was about 0.5 ml.

Subsequently, the above-described base plate was fired. Firing was performed under the following conditions of 250° C., 300° C., 350° C. and 500° C.

250° C. condition: the temperature was increased from room temperature to 250° C. in 1 hour in the atmospheric air, maintained at 250° C. for 25 hours, and cooled down to room temperature in 1 hour.

300° C. condition: the temperature was increased from room temperature to 300° C. in 1 hour in the atmospheric air, maintained at 300° C. for 25 hours, and cooled down to room temperature in 1 hour.

350° C. condition: the temperature was increased from room temperature to 350° C. in 1 hour in the atmospheric air, maintained at 350° C. for 25 hours, and cooled down to room temperature in 1 hour.

500° C. condition: the temperature was increased from room temperature to 500° C. in 1 hour in the atmospheric air, maintained at 500° C. for 1 hour, and cooled down to room temperature in 1 hour.

A metal oxide ($TiO_2$) film was formed on the surface of each glass base plate by the above-described firing.

Moreover, a thick film was formed under the following condition.

500° C. thick film condition: Coating Liquid B produced in the above-described (a) was applied onto the surface of each base plate made of PYREX (registered trademark) glass in the size of 50 mm×50 mm under the same conditions as above by the spin coat method. Thereafter, the temperature was increased from room temperature to 500° C. in 1 hour in the atmospheric air, maintained at 500° C. for 1 hour, and cooled down to room temperature in 1 hour. Thereby, a thick metal oxide ($TiO_2$) film was formed on each base plate of PYREX (registered trademark) glass.

(c) Evaluation of the Metal Oxide Films

With respect only to the metal oxide films which were formed using the Coating Liquid A under the 500° C. firing condition, and under 500° C. thick film condition among the metal oxide films formed in the above-described (b), each surface was observed by an optical microscope. The upper part of FIG. 1 shows a microscope image of the metal oxide film formed using the Coating Liquid A under the 500° C. firing condition, and the lower part of FIG. 1 shows a microscope image of the metal oxide film formed under the 500° C. thick film condition. As shown in the microscope images in the upper and lower parts of FIG. 1, no crack was observed on either of the metal oxide films.

Also, hardness of the metal oxide films formed in the above-described (b) was measured. The results are shown in Table 1.

TABLE 1

| | Firing Condition | | | |
| --- | --- | --- | --- | --- |
| | 250° C. Condition | 300° C. Condition | 350° C. Condition | 500° C. Condition |
| Embodiment 1 | H | 5H | 9H or higher | 9H or higher |
| Comparative Example 2 | 6B or lower | 6B or lower | 6B or lower | — |

As shown in FIG. 1, the metal oxide films, formed under any of the firing conditions of 250° C., 300° C., 350° C. and 500° C., have hardness of H or higher. Conditions for measuring hardness conform with Pencil Scratch Test (JIS K 5400). In Table 1, measurement results of metal oxide films produced in later-described Comparative Example 2 are also shown.

Additionally, transparency of the metal compound films formed in the above-described (b) was measured. Turbidity of 0.1 or lower was measured. The measuring method of transparency was conformed to Plastics—Determination of haze for transparent materials (JIS K 7136).

The metal compound films formed in the above-described (b) are flat and smooth and has an excellent adhesion to a glass base plate.

(d) Evaluation of Photocatalytic Action (i) With respect only to the metal oxide film which was formed under the 500° C. firing condition among the metal oxide films formed in the above-described (b), a contact angle of water on the surface of the metal oxide film was measured. The measurement was performed before UV irradiation, and after predetermined hours of UV irradiation. A 40 W-BLB lamp was used for a light source. The conditions for UV irradiation were such that the UV intensity on a tested surface became 2.4 mW/cm². The measurement results are shown in Table 2.

TABLE 2

| UV Irradiation Time (hour) | Water Contact Angle (°) |
| --- | --- |
| 0 | 64 |
| 1 | 10 |
| 2 | 10 |
| 3 | 7 |
| 6 | 3> |
| 24 | 3> |

As shown in Table 2, although the contact angle before UV irradiation was about 64°, the metal oxide film became hydrophilic such that the contact angle became about 10° after 1-hour UV irradiation, and such super-hydrophilic that the contact angle became 3° or smaller after 6-hour UV irradiation. The result shows that the metal oxide film is optically induced to become super-hydrophilic.

With respect only to the metal oxide films which were formed under the 300° C. and 350° C. firing conditions, among the metal oxide films formed in the above-described (b), a contact angle of water on the surface of each of the metal oxide films was measured. The measurement was performed before UV irradiation (beginning), and after 1-hour, 2-hour, and 3-hour UV irradiation. A 40 W-BLB lamp was used for a light source. The conditions for UV irradiation were such that the UV intensity on a tested surface became 2.4 mW/cm². The measurement results are shown in Table 3.

TABLE 3

| | | UV Irradiation Time | | | |
| --- | --- | --- | --- | --- | --- |
| | | Beginning | 1 hour | 2 hours | 3 hours |
| Embodiment 1 | 300° C. Firing Condition | 47.6 | 12.4 | 11.3 | 6.7 |
| | 350° C. Firing Condition | 27.3 | 3.9 | 3.3 | 3.1 |
| Comparative Example 2 | 300° C. Firing Condition | 15.6 | 5.8 | 5.0 | 4.9 |
| | 350° C. Firing Condition | 17.7 | 5.9 | 5.0 | 4.9 |

As shown in Table 3, super-hydrophilicity was achieved such that the contact angle became 10° or smaller even in the case of the 300° C. and 350° C. firing conditions. Specifically, in the case of 350° C. firing condition, super-hydrophilicity was achieved only after 1-hour irradiation. In Table 3, measurement results of metal oxide films produced in the later-described Comparative Example 2 are also shown.

(ii) After the metal oxide film was formed in the above-described (b) and a glass base plate fired under the 500° C. condition was dipped in 0.1 mM of methylene blue aqueous solution for a night and rinsed with distilled water, initial absorbance of the glass base plate was measured. Subsequently, during UV irradiation to the metal oxide film, absorbance of the glass base plate was measured at predetermined time intervals. The results were shown in FIG. 2. The test conditions conform with the test method for wet degradation performance for photocatalytic products (Photocatalysis Industry Association of Japan).

Figure 2:
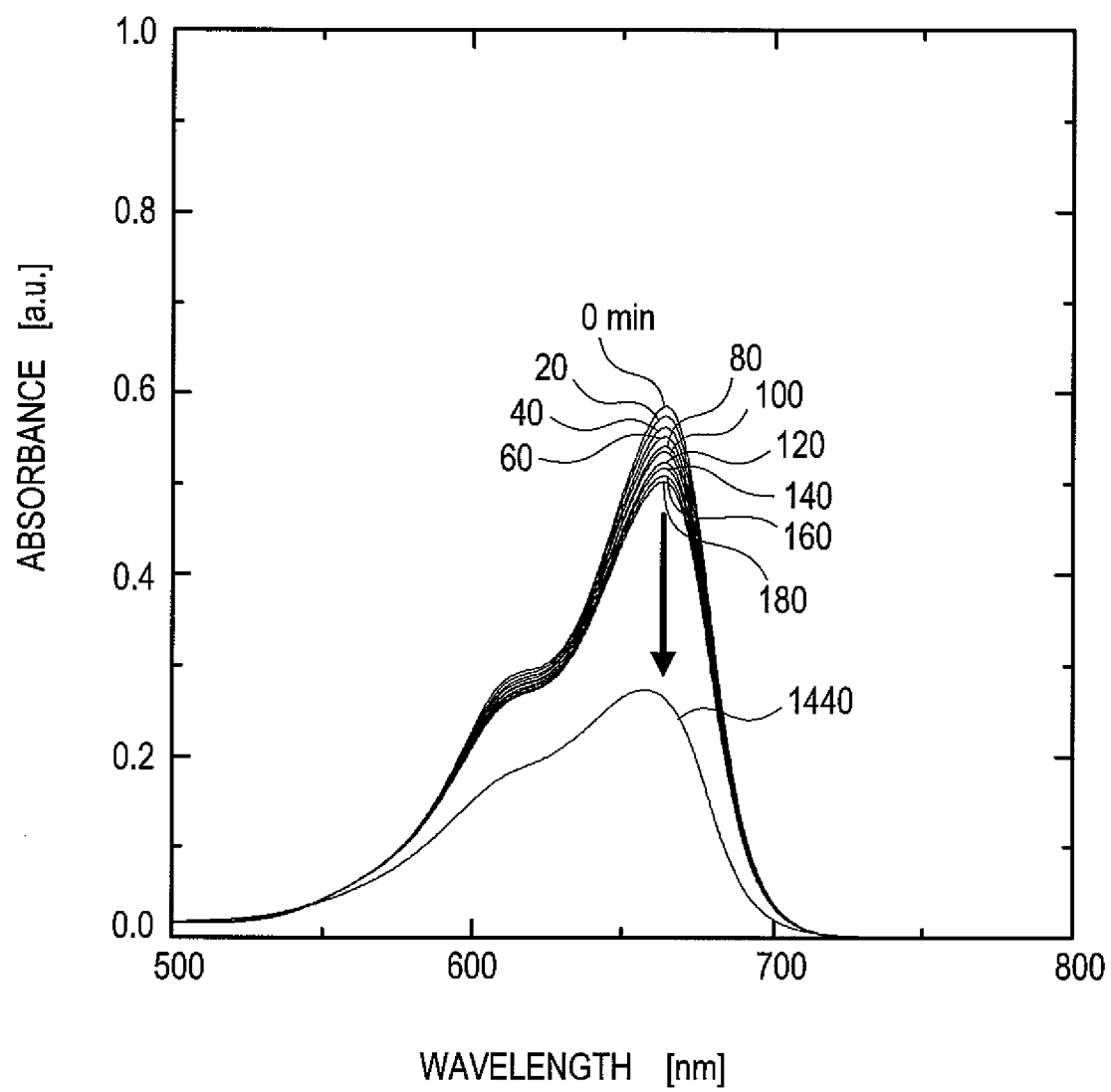
FIG. 2 is a graph showing transition of absorbance of the metal oxide film, when methylene blue is adhered to the surface of the metal oxide film and ultraviolet is radiated thereon.

As shown in FIG. 2, the peak (absorbance) around 664 nm wavelength arising from methylene blue became smaller after 20 minutes of UV irradiation. With increase in UV irradiation time, the peak was continuously decreased. At the point of 24 hours after the start of UV irradiation, the peak around 664 nm wavelength was reduced to approximately one third of the initial absorbance. The result indicates that the metal oxide film decomposed methylene blue by photocatalytic action.

From the experimental results of the above-described (i) and (ii), it was confirmed that the metal oxide film produced in Embodiment 1 has high photocatalytic activity.

Embodiment 2

(a) Producing Coating Liquid

A solution was prepared wherein acetone and benzene were blended in the volume ratio of 1:1. Into the solution, 1.1 g (10 mmol) of catechol was dissolved so as to obtain a mixed solution. To the mixed solution, titanium(IV) isopropoxide were added as much as the mol ratio of titanium(IV) isopropoxide and catechol became 1:2. Then, preparation of the coating liquid was completed. The total amount of the solvent in the coating liquid was adjusted such that the concentration of titanium(IV) isopropoxide became 0.1 M. The coating liquid produced in Embodiment 2 is a titanium catecholate solution as the coating liquid of the Embodiment 1 is.

(b) Forming a Metal Oxide Film on the Surface of a Glass Base Plate

In the same manner as in Embodiment 1, a metal oxide film was formed on the surface of a base plate made of PYREX (registered trademark) glass in the size of 50 mm×50 mm, using the coating liquid produced in the above-described (a). The above-described 500° C. condition was used for the firing condition after the coating liquid was applied.

The metal oxide film formed in Embodiment 2 has the same effect as in Embodiment 1.

Embodiment 3

(a) Forming Metal Oxide Films

The coating liquid produced in the above-described (a) of Embodiment 1 was applied to each of the base plates made of various materials which are later-described, and fired to form a metal oxide film. For the method of applying the coating liquid, the drop coat method was used if the base plate is made of glass fiber. In the case of the base plates made of other materials, the flow coat method was used. For the firing condition, the above-described 500° C. condition was used in all cases.

(b) Testing Photocatalytic Activity (i) Contact angles of water of the metal oxide films formed in the above-described (a) were measured before UV irradiation and after 10-minute irradiation. If the measured value was 20° or larger before UV irradiation (initial value) and 5° or smaller after 10-minute irradiation, hydrophilicity of the metal oxide film was evaluated as "good". The results are shown in Table 4.

TABLE 4

| Base Plate Material | Hydrophilicity Test |
|---|---|
| Soda Glass | Good |
| PYREX (registered trademark) glass | Good |
| Silica Glass (Quartz) | Good |
| Tile | Good |
| Copper | Good |
| Brass | Good |
| Aluminum | Good |
| Albata (Cu—Ni—Zn) | Good |

As shown in Table 4, when the base plate was made of soda glass, PYREX (registered trademark) glass, silica glass, tile, copper, brass, aluminum or albata (Cu—Ni—Zn), hydrophilicity of the metal oxide film was evaluated as "good".

(ii) Each of the base plate, on which the metal oxide film was formed in the above-described (a), was dipped in 0.01 M of silver nitrate, and irradiated by UV light for 10 minutes. If adhesion of silver was observed at the irradiated part of the base plate, the photocatalytic activity of the metal oxide film was evaluated as "good". The results are shown in Table 5.

TABLE 5

| Base Plate Material | Silver Nitrate Test |
|---|---|
| Soda Glass | Good |
| PYREX (registered trademark) glass | Good |
| Silica Glass (Quartz) | Good |
| Tile | Good |
| Copper | Good |
| Aluminum | Good |
| Albata (Cu—Ni—Zn) | Good |
| Glass Fiber | Good |

As shown in Table 5, when the base plate is made of soda glass, PYREX (registered trademark) glass, silica glass, tile, copper, aluminum, albata (Cu—Ni—Zn) or glass fiber, hydrophilicity of the metal oxide film was evaluated as "good".

From the experimental results of the above-described (i) and (ii), it was confirmed that a metal oxide film can be formed on the surface of the base plate made of any of the above-described materials by the coating liquid produced in Embodiment 1, and the formed metal oxide film has photocatalytic activity.

Embodiment 4

(a) Producing Coating Liquid

Aluminum s-butoxide (Aluminium(III) sec-butoxide) and a suitable amount of benzene were blended to produce a solution 1. Also, catechol was dissolved into a suitable amount of benzene to produce a solution 2. To the solution 2, the solution 1 was added as much as the mol ratio of aluminum s-butoxide and catechol became 2:3 so as to obtain a mixed solution. The total amount of the solvent in the mixed solution was adjusted such that the concentration of aluminum s-butoxide became 0.2 M. Subsequently, the above-described mixed solution was refluxed approximately for 10 minutes, and then benzene was added so as to adjust the concentration of aluminum to 0.05 M. Preparation of the coating liquid was completed. The coating liquid is a solution of aluminum catechol complex.

(b) Forming a Metal Oxide Film on the Surface of a Silicon Wafer Substrate (Base Plate)

The coating liquid produced in the above-described (a) was applied onto the surface of a silicon wafer substrate by the spin coat method (at 1000 rpm for 30 seconds). The silicon wafer substrate was then fired under the above-described 500° C. condition.

(c) Evaluation of the Metal Oxide Film

After the coating liquid was applied by the spin coat method in the above-described (b), the surface of the silicon wafer substrate was observed. It was found that the surface was uniformly finished.

Figure 3:
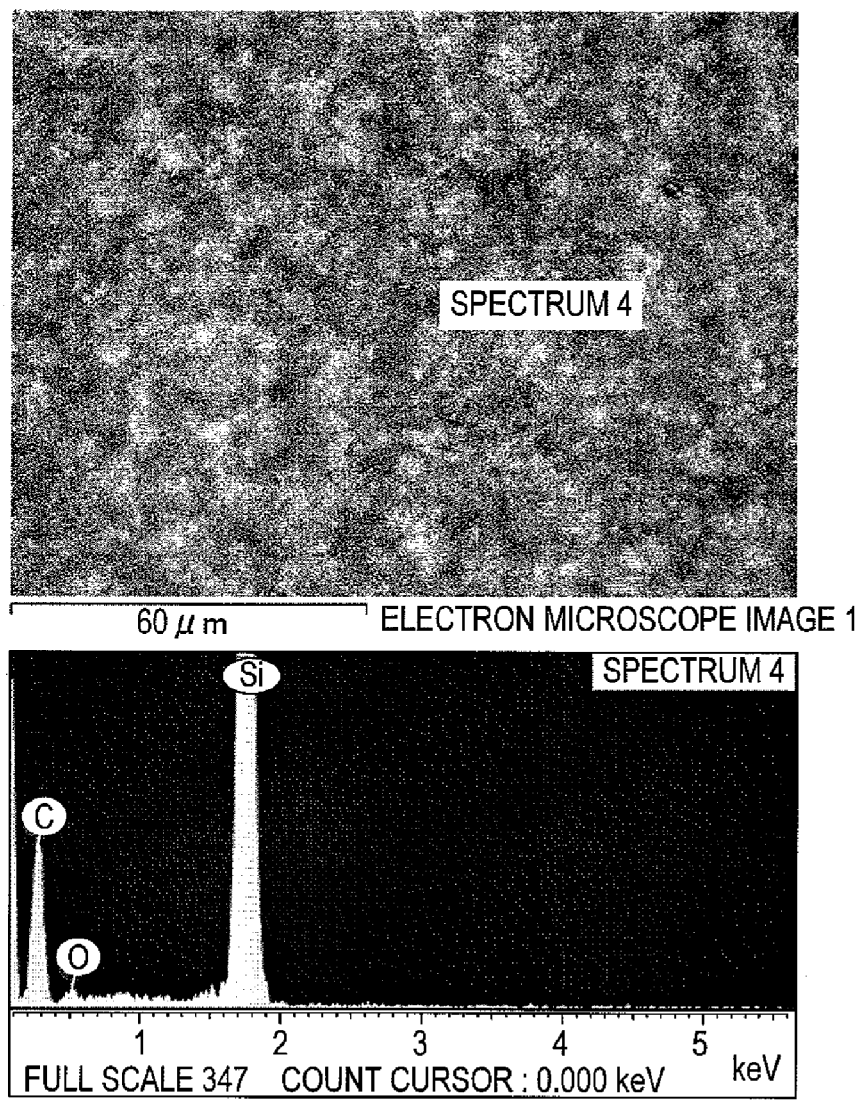
FIG. 3 is a SEM (scanning electron microscope) image showing the surface of the metal oxide film, and a chart showing elemental analysis results.
Figure 4:
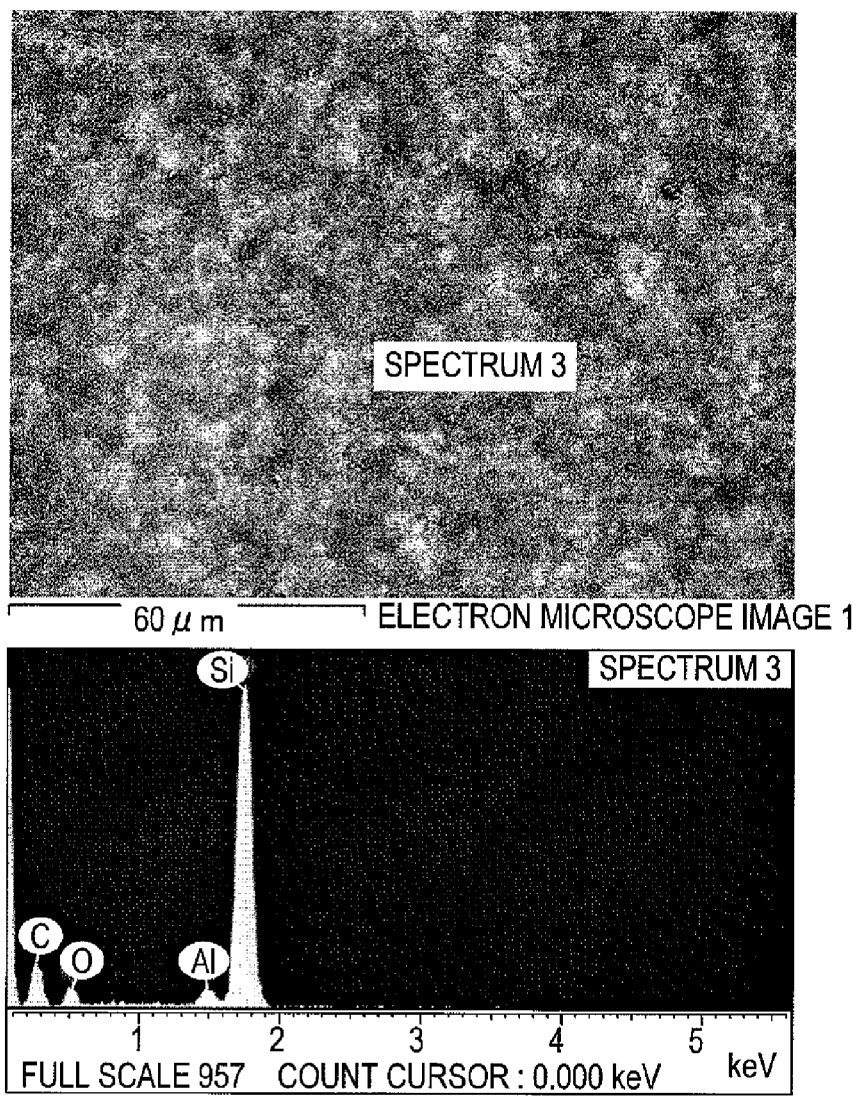
FIG. 4 is a SEM image showing the surface of the metal oxide film, and a chart showing elemental analysis results.
Figure 5:
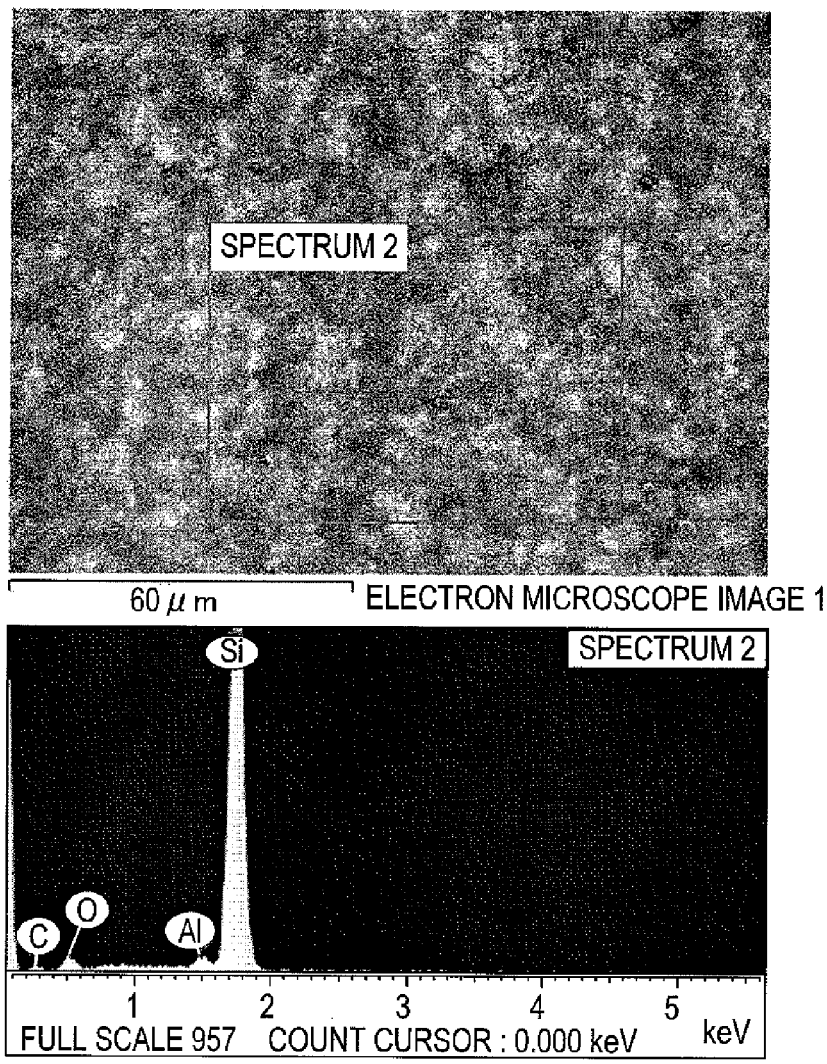
FIG. 5 is a SEM image showing the surface of the metal oxide film, and a chart showing elemental analysis results.

Also, after the firing in the above-described (b), the surface of the silicon wafer substrate was observed by a SEM. At the same time, elemental analysis was performed by energy dispersive X-ray spectroscopy (EDAX). The upper parts of FIGS. 3-5 show the observed SEM images (images of the same location). Each of these SEM images includes both a portion which looks white and a portion which looks black. In the SEM image of FIG. 3, a portion labeled as SPECTRUM 4 is the portion which looks white. When elemental analysis of this portion was conducted, Si of the silicon wafer substrate was detected (the middle and the lower parts of FIG. 3). In the SEM image of FIG. 4, a portion labeled as SPECTRUM 3 is the portion which looks black. When elemental analysis of this portion was conducted, Si of the silicon wafer substrate and Al of the metal oxide film were detected (the middle and the lower parts of FIG. 4). In the SEM image of FIG. 5, an area labeled as SPECTRUM 2 includes both the portion which looks white and the portion which looks black. When elemental analysis of this area was conducted, Si of the silicon wafer substrate and Al of the metal oxide film were detected (the middle and the lower parts of FIG. 5). From the above results, it was confirmed that a uniform aluminum oxide film was formed on the silicon wafer substrate.

Embodiment 5

(a) Producing Coating Liquid

A solution was prepared wherein catechol was dissolved in toluene. To the solution, niobium(V) ethoxide (niobium(V) ethoxide) was added as much as the mol ratio of niobium(V) ethoxide and catechol became 1:2 so as to obtain a mixed solution. The total amount of the solvent in the mixed solution was adjusted such that the concentration of niobium(V) ethoxide became 0.1 M. The above-described mixed solution was then distilled until the temperature of steam became 110° C. and half of the solvent was vaporized. Thereafter, toluene was added so as to adjust the concentration of niobium to 0.05 M. Then, preparation of the coating liquid was completed. The coating liquid is a solution of niobium catechol complex.

(b) Forming a Metal Oxide Film on the Surface of a Silicon Wafer Substrate

The coating liquid produced in the above-described (a) was applied onto the surface of a silicon wafer substrate by the spin coat method (at 1000 rpm for 30 seconds). The silicon wafer substrate was then fired under the above-described 500° C. condition.

(c) Evaluation of the Metal Oxide Film

After the coating liquid was applied by the spin coat method in the above-described (b), the surface of the silicon wafer substrate was observed. It was found that the surface was uniformly finished.

Figure 6:
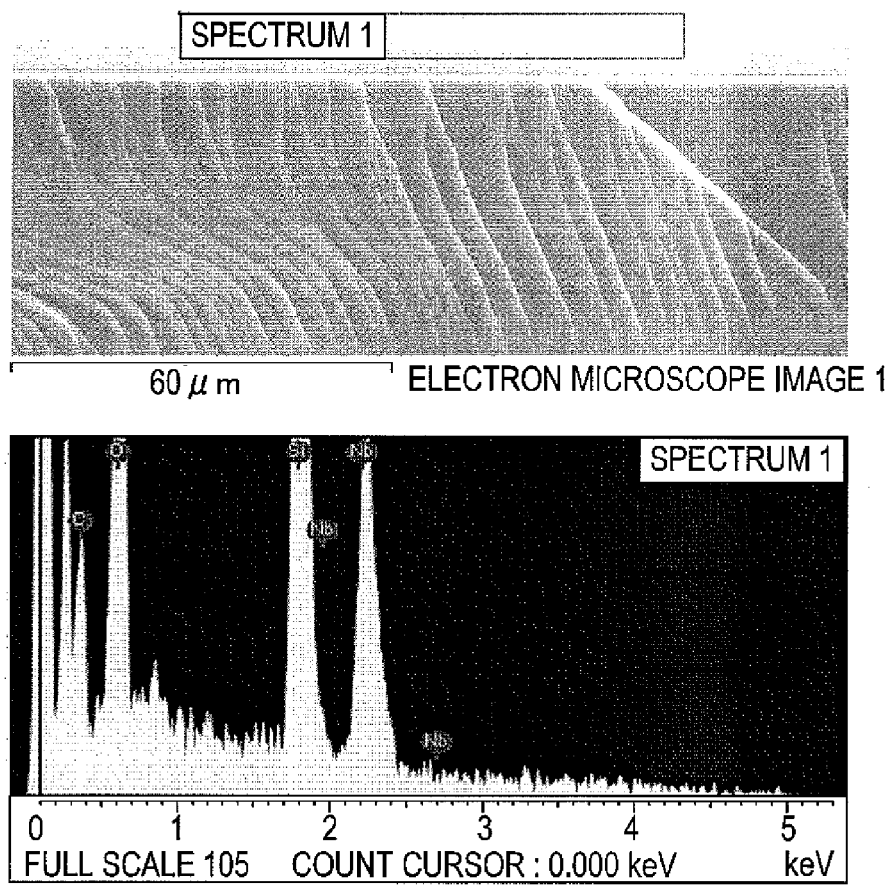
FIG. 6 is a SEM image showing the surface of the metal oxide film, and a chart showing elemental analysis results.
Figure 6:
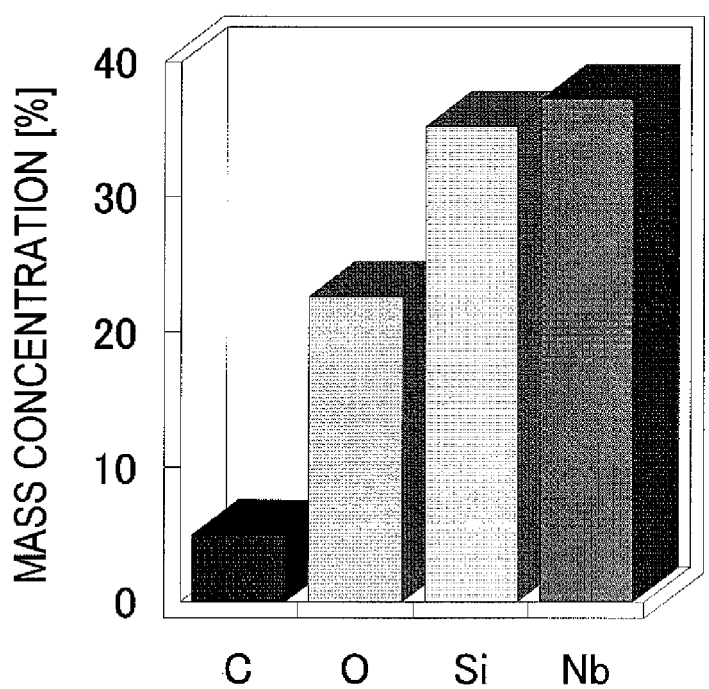

Also, after the firing in the above-described (b), the surface of the silicon wafer substrate was observed by a SEM. At the same time, elemental analysis was performed by energy dispersive X-ray spectroscopy (EDAX). The upper image of FIG. 6 shows the observed SEM image. No nonuniform pattern is found in this SEM image. When elemental analysis was conducted to a certain area of this SEM image, Nb, Si, O and C were detected as shown in the middle and the lower parts of FIG. 6. From these results, it was confirmed that a uniform $Nb_2O_5$ film was formed on the silicon wafer substrate.

Embodiment 6

(a) Producing Coating Liquid

A solution was prepared wherein catechol was dissolved in a suitable amount of xylene. To the solution, ethoxide orthosillicate (TEOS—Tetraethyl Orthosillicate) was added as much as the mol ratio of ethoxide orthosillicate and catechol became 1:2 so as to obtain a mixed solution. The total amount of the solvent in the mixed solution was adjusted such that the concentration of ethoxide orthosillicate became 0.1 M. The above-described mixed solution was refluxed approximately for 1 hour, and then distilled until the temperature of steam became 140° C. and half of the solvent was vaporized. Thereafter, xylene was added so as to adjust the concentration of silicon to 0.05 M. Then, preparation of the coating liquid was completed. The coating liquid is a solution of silicon catechol complex.

(b) Forming a Metal Oxide Film on the Surface of an Aluminum Base Plate

The coating liquid produced in the above-described (a) was applied onto the surface of an aluminum base plate by the spin coat method (at 1000 rpm for 30 seconds). The aluminum base plate was then fired under the above-described 500° C. condition.

(c) Evaluation of the Metal Oxide Film

After the coating liquid was applied by the spin coat method in the above-described (b), the surface of the aluminum base plate was observed. It was found that the surface was uniformly finished.

Figure 7:
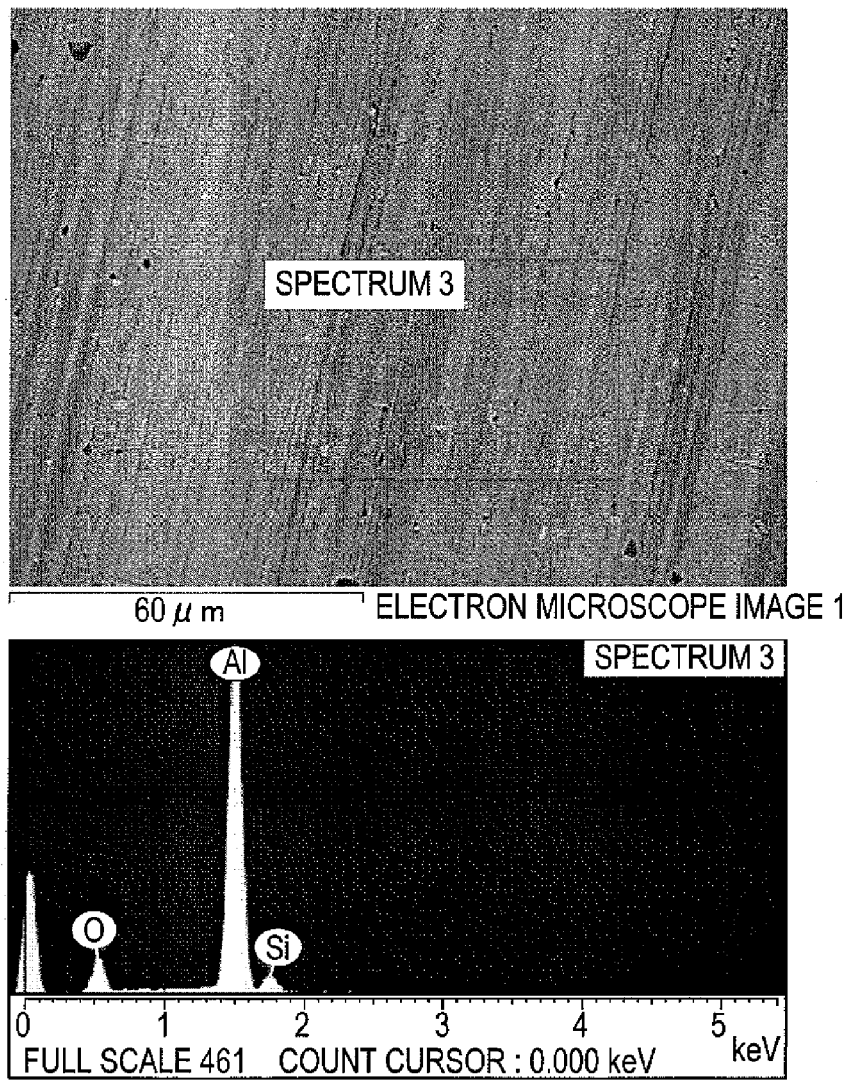
FIG. 7 is a SEM image showing the surface of the metal oxide film, and a chart showing elemental analysis results.

Also, after the firing in the above-described (b), the surface of the aluminum base plate was observed by a SEM. At the same time, elemental analysis was performed by energy dispersive X-ray spectroscopy (EDAX). The upper image of FIG. 7 shows the observed SEM image. No nonuniform pattern is found in this SEM image. When elemental analysis was conducted to an area labeled as SPECTRUM 3 in the SEM image of FIG. 7, Al of the aluminum base plate and Si of the metal oxide film were detected (the middle and the lower parts of FIG. 7). From these results, it was confirmed that a uniform Si oxide film was formed on the aluminum base plate.

Embodiment 7

(a) Producing Coating Liquid

A solution was prepared wherein catechol was dissolved in a suitable amount of xylene. To the solution, germanium(IV) propoxide (Germanium(IV) propoxide) was added as much as the mol ratio of germanium(IV) propoxide and catechol became 1:2 so as to obtain a mixed solution. The total amount of the solvent in the mixed solution was adjusted such that the concentration of germanium(IV) propoxide became 0.1 M. The above-described mixed solution was refluxed approximately for 1 hour, and then distilled until the temperature of steam became 140° C. and half of the solvent was vaporized. Thereafter, xylene was added so as to adjust the concentration of germanium to 0.05 M. Then, preparation of the coating liquid was completed. The coating liquid is a solution of germanium catechol complex.

(b) Forming a Metal Oxide Film on the Surface of an Aluminum Base Plate

The coating liquid produced in the above-described (a) was applied onto the surface of an aluminum base plate by the spin coat method (at 1000 rpm for 30 seconds). The aluminum base plate was then fired under the above-described 500° C. condition.

Embodiment 8

(a) Producing Coating Liquid

A solution was prepared wherein catechol was dissolved in a suitable amount of toluene. To the solution, niobium(V) ethoxide (Niobium(V)ethoxide) was added as much as the mol ratio of niobium(V) ethoxide and catechol became 2:5. The total amount of the solvent in the solution was adjusted such that the concentration of niobium(V) ethoxide became 0.5 M. Then, a half of the solution was distilled, while the temperature of steam became 100° C. Volatile components of the mixed solution remained after distillation were vaporized under reduced pressure by a rotary evaporator. The residual solid was further heated to 100° C. under vacuum using a vacuum dryer so that the remaining volatile components were completely removed. Drying was continued until the solid (niobium catecholate) was obtained as much as the amount close to the theoretical value (approximately 98%).

In Embodiment 8, 56.0 g (yield percentage: 98%) of solid (niobium catecholate) was obtained from the solution of niobium(V) ethoxide (50.0 g, 0.157 mol), catechol (43.3 g, 0.939 mol), and toluene (320 mL). The obtained solid (niobium catecholate) was dissolved into a mixed solution wherein acetylacetone and toluene were blended in the volume ratio of 1:4. The concentration of niobium in the compound liquid was adjusted to be 0.10 M, or 4 wt. %, and then, preparation of the coating liquid was completed.

(b) Forming Metal Oxide Films

On the surface of each base plate made of soda lime glass (SLG) or PYREX (registered trademark) glass in the size of 50 mm×50 mm having a thickness of 3 mm, the coating liquid produced in the above-described (a) was applied by the spin coat method so as to form a film. The rotation speed in the spin coat method was determined to be 750 rpm, and the drop amount to be about 0.4 ml.

Each of the coating glass base plate coated with the coating liquid was fired in atmospheric air using an electric furnace so as to obtain $Nb_2O_5$ coating glass. With respect to the firing condition, the temperature was increased to a predetermined firing temperature (300, 350, 400, 450, 500, 550 or 600° C.) at the temperature increase rate of 10° C./min, and after kept for 1 hour at the firing temperature, the coating glass was naturally cooled. A favorable niobium oxide film was obtained on the coating glass base plate after the firing.

(c) Evaluation of the Metal Oxide (Niobium Oxide) Films (i) Measurements of Total Transmittance, Turbidity, and Color Difference With regard to each coating glass on which the niobium oxide film was formed in the above-described (b), total transmittance, turbidity, and color difference were measured. Total transmittance and turbidity were measured based on JIS K 7136 by using NDH-500W produced by Nippon Denshoku Industries Co., Ltd. Color difference was measured based on JIS Z 8722 by using SE-2000 produced by Nippon Denshoku Industries Co., Ltd. The results are shown in Table 6 below.

TABLE 6

| Metal Oxide | Base Plate | Firing Temperature (° C.) | Total Transmittance (%) | Turdity (%) | Color Difference (ΔE) |
|---|---|---|---|---|---|
| $Nb_2O_5$ | SLG | 300 | 79.79 | 0.25 | 11.39 |
| $Nb_2O_5$ | SLG | 350 | 81.09 | 0.23 | 9.17 |
| $Nb_2O_5$ | SLG | 400 | 82.03 | 0.20 | 7.02 |
| $Nb_2O_5$ | SLG | 450 | 86.76 | 0.17 | 2.54 |
| $Nb_2O_5$ | SLG | 500 | 86.48 | 0.40 | 2.52 |
| $Nb_2O_5$ | SLG | 550 | 86.47 | 0.20 | 2.49 |

TABLE 6-continued

| Metal Oxide | Base Plate | Firing Temperature (° C.) | Total Transmittance (%) | Turdity (%) | Color Difference (ΔE) |
|---|---|---|---|---|---|
| $Nb_2O_5$ | SLG | 600 | 85.08 | 0.17 | 3.44 |
| $Nb_2O_5$ | PYR | 500 | 87.95 | 0.14 | 1.79 |

*SLG = soda-lime glass
PYR = PYREX (ii) Test for Photo-Induced Reduction Reaction of Silver Nitrate (Niobium Oxide)

Each coating glass on which the niobium oxide film was formed in the above-described (b) was dipped in 0.01 M of silver nitrate aqueous solution such that the coating glass is located at 50 mm below water surface. With that state, artificial sunlight was irradiated for 1 hour, and presence or absence of metallic silver deposition by photocatalytic reaction (that is, photocatalytic activity) was evaluated. The results are shown in Table 7 below. Silver deposition (presence or absence of reaction) was visually confirmed.

TABLE 7

| Metal Oxide | Base Plate | Firing Temperature (° C.) | Silver Deposition* |
|---|---|---|---|
| $Nb_2O_5$ | SLG | 300 | X |
| $Nb_2O_5$ | SLG | 350 | X |
| $Nb_2O_5$ | SLG | 400 | X |
| $Nb_2O_5$ | SLG | 450 | X |
| $Nb_2O_5$ | SLG | 500 | ◯ |
| $Nb_2O_5$ | SLG | 550 | ◯ |
| $Nb_2O_5$ | SLG | 600 | ◯ |
| $Nb_2O_5$ | PYR | 500 | X |

*presence of silver deposition: ◯, absence of silver deposition (iii) Test for Photo-Induced Super-Hydrophilic Property Each coating glass on which the niobium oxide film was formed in the above-described (b) was irradiated by UV light. Change in a contact angle of water on the surface of the niobium oxide film before and after the irradiation was measured. The results are shown in Table 8 below. The UV light was irradiated by using a 40 W-BLB lamp, at the intensity of 2.4 mW/cm$^2$ (intensity having a light wavelength of 365 nm). The contact angle was measured before irradiation, and after 1-hour, 2-hour, 3-hour, 6-hour and 24-hour irradiation.

TABLE 8

| Metal Oxide | Base Plate | Firing Temperature (° C.) | Contact Angle (°) | | | | | | Super-hydrophilic Property after 1 hour |
|---|---|---|---|---|---|---|---|---|---|
| | | | Before Irradiation | 1 h | 2 h | 3 h | 6 h | 24 h | |
| $Nb_2O_5$ | SLG | 300 | 49.7 | 56.2 | 55.0 | 56.6 | 59.8 | 55.4 | x |
| $Nb_2O_5$ | SLG | 350 | 51.3 | 56.9 | 55.6 | 57.0 | 57.9 | 55.2 | x |
| $Nb_2O_5$ | SLG | 400 | 36.9 | 30.1 | 26.4 | 26.5 | 23.9 | 20.9 | x |
| $Nb_2O_5$ | SLG | 450 | 31.4 | 18.7 | 15.9 | 12.9 | 11.7 | 15.1 | x |
| $Nb_2O_5$ | SLG | 500 | 32.7 | 3.7 | 3.3 | 4.2 | 2.3 | 4.2 | ◯ |
| $Nb_2O_5$ | SLG | 550 | 27.3 | 2.1 | 2.5 | 4.4 | 3.0 | 4.7 | ◯ |
| $Nb_2O_5$ | SLG | 600 | 29.0 | 7.0 | 5.8 | 6.5 | 5.7 | 5.8 | x |
| $Nb_2O_5$ | PYR | 500 | 44.9 | 3.9 | 3.9 | 4.0 | 2.1 | 1.2 | ◯ |

(iv) Test Results

In the case of the base plate made of soda-lime glass, photocatalytic activity was markedly exhibited. Especially, at the firing temperature of 500° C. or higher, photocatalytic activity increased. Super-hydrophilic property was exhibited regardless of the firing temperature. Especially, at the firing temperature of 500-550° C., super-hydrophilic property increased. The reason why hydrophilic property was not good at the firing temperature of 600° C. is because the niobium oxide may have changed to other crystal phase.

It was confirmed from the above test results that the niobium oxide film is effective as a photo-activated self-cleaning coating.

Embodiment 9

A coating liquid was prepared by adding 2-aminophenol (218 mg, 2 mmol) and titanium(IV) isopropoxide (TTIP) (284 mg, 1 mmol) as reagents to a solvent (10 mL) of toluene/2-butanone (mol ratio: 1:1) and then dissolving the reagents using ultrasonic irradiation. Thereafter, the coating liquid was applied to a PYREX (registered trademark) glass base plate by the spin coat method, and fired for 1 hour at 500° C. using an electric furnace. As a result, a metal oxide (CNO—Ti) film was formed on the glass base plate.

Figure 16:
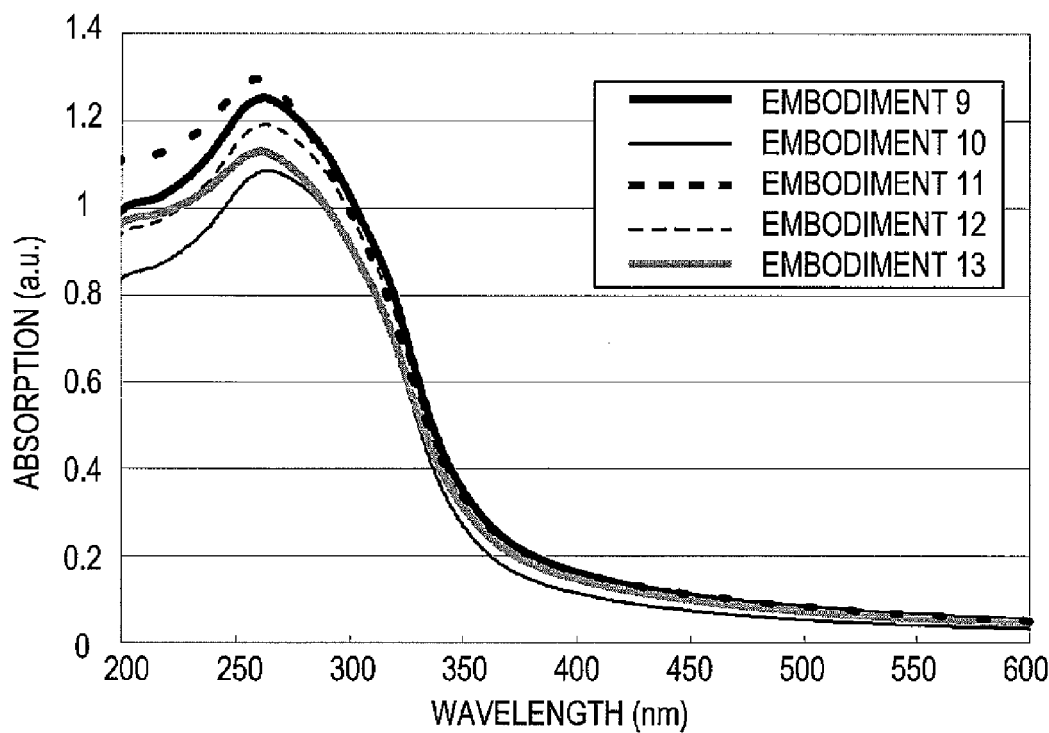
FIG. 16 is a graph showing visible light absorption properties of the metal oxide film.

Absorbance spectrum of the glass base plate on which the metal oxide film was formed as above was measured using a visible-ultraviolet spectrophotometer (U-3310 manufactured by Hitachi High-Technologies Corporation) so as to evaluate visible light absorption property of the metal oxide film (see FIG. 16).

Visible light response property (photo-induced hydrophilic property) of the formed metal oxide film was also evaluated in a manner below. That is, after irradiating visible light to the metal oxide film, a contact angle of water was measured to evaluate photo-induced hydrophilic property (see FIG. 17). A fluorescent lamp (20000 lx) was used as a light source. Light having a wavelength of 420 nm or shorter was cut off by a filter. As a contact angle meter, OCA 15plus manufactured by Dataphysics Instrument GmbH was used.

The measurement results using the visible-ultraviolet spectrophotometer showed that the initial rise of the absorption edge of the metal oxide film was in the vicinity of 400-450 nm (visible light absorption property of the metal oxide film is higher than that of an ordinary titanium oxide film). The contact angle of water after irradiation of light in which ultraviolet light having a wavelength of 420 nm or shorter was smaller than the value before the irradiation, and further became smaller along with increase in irradiation time. This indicates that photo-induced hydrophilic property which is one of photocatalytic activity is exhibited by visible light.

Embodiment 10

A coating liquid was prepared by adding 2-aminophenol (250 mg, 2 mmol) and TTIP (284 mg, 1 mmol) as reagents to a solvent (10 mL) of toluene and then dissolving the reagents using ultrasonic irradiation. Thereafter, the coating liquid was applied to a PYREX (registered trademark) glass base plate by the spin coat method, and was fired for 1 hour at 500° C. using an electric furnace. As a result, a metal oxide (CNS—Ti) film was formed on the glass base plate.

Figure 17:
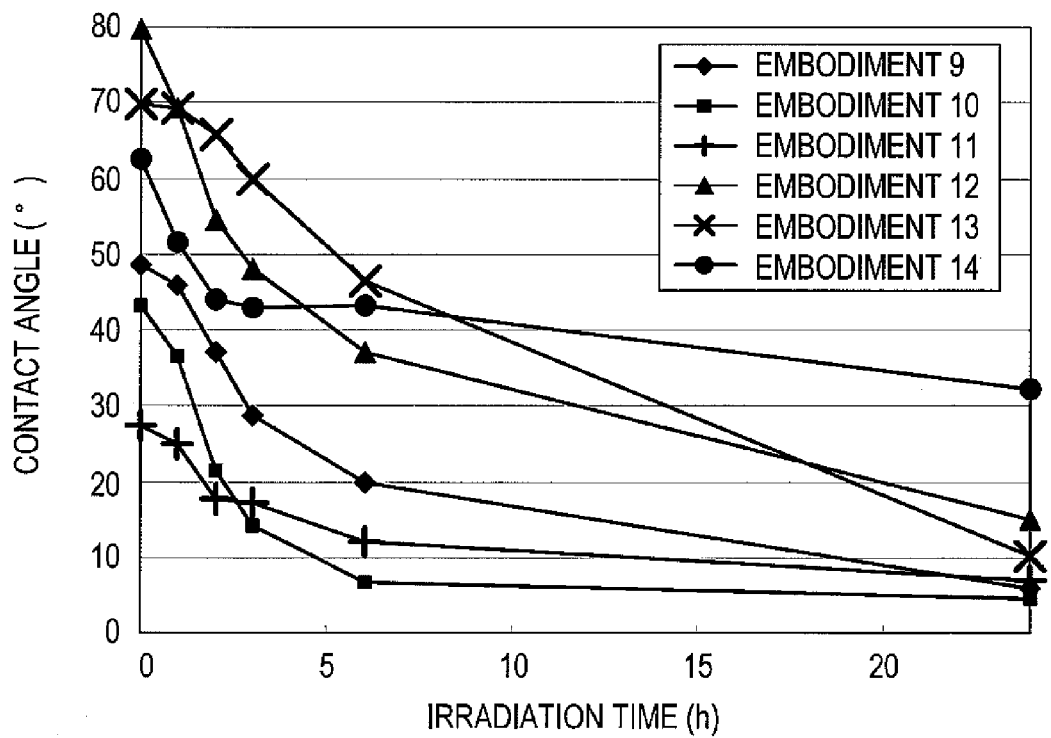
FIG. 17 is a graph showing change of contact angles in the metal oxide film.

With regard to the metal oxide film formed as above, visible light absorption property and photo-induced hydrophilic property were evaluated in the same manner as in Embodiment 9 (see FIGS. 16 and 17). The results were much the same as in the case of Embodiment 9.

Embodiment 11

A coating liquid was prepared by adding 2-mercaptophenol (252 mg, 2 mmol) and TTIP (284 mg, 1 mmol) as reagents to a solvent (10 mL) of toluene and then dissolving the reagents using ultrasonic irradiation. Thereafter, the coating liquid was applied to a PYREX (registered trademark) glass base plate by the spin coat method, and fired for 1 hour at 500° C. using an electric furnace. As a result, a metal oxide (COS—Ti) film was formed on the glass base plate.

With regard to the metal oxide film formed as above, visible light absorption property and photo-induced hydrophilic property were evaluated in the same manner as in Embodiment 9 (see FIGS. 16 and 17). The results were much the same as in the case of Embodiment 9.

Embodiment 12

A coating liquid was prepared by adding anthranilic acid (274 mg, 2 mmol) and TTIP (284 mg, 1 mmol) as reagents to a solvent (10 mL) of toluene/2-butanone (mol ratio: 1:1) and then dissolving the reagents using ultrasonic irradiation. Thereafter, the coating liquid was applied to a PYREX (registered trademark) glass base plate by the spin coat method, and the coated base plate was fired for 1 hour at 500° C. using an electric furnace. As a result, a metal oxide (ANT—Ti) film was formed on the glass base plate.

With regard to the metal oxide film formed as above, visible light absorption property and photo-induced hydrophilic property were evaluated in the same manner as in Embodiment 9 (see FIGS. 16 and 17). The results were much the same as in the case of Embodiment 9.

Embodiment 13

A coating liquid was prepared by adding thiosalicyclic acid (308 mg, 2 mmol) and TTIP (284 mg, 1 mmol) as reagents to a solvent (10 mL) of toluene/2-butanone (mol ratio: 1:1) and then dissolving the reagents using ultrasonic irradiation. Thereafter, the coating liquid was applied to a PYREX (registered trademark) glass base plate by the spin coat method, and fired for 1 hour at 500° C. using an electric furnace. As a result, a metal oxide (TAL—Ti) film was formed on the glass base plate.

With regard to the metal oxide film formed as above, visible light absorption property and photo-induced hydrophilic property were evaluated in the same manner as in Embodiment 9 (see FIGS. 16 and 17). The results were much the same as in the case of Embodiment 9.

Embodiment 14

A coating liquid was prepared by adding 3,4-dihydroxybenzoic acid-titanium complex (176 mg, 1 mmol) as reagents to a solvent (10 mL) of acetylacetone/acetic ethyl (mol ratio: 1:4) and then dissolving the reagents using ultrasonic irradiation. Thereafter, the coating liquid was applied to a PYREX (registered trademark) glass base plate by the spin coat method, and fired for 1 hour at 500° C. using an electric furnace. As a result, a metal oxide (HOOC—CT—Ti) film was formed on the glass base plate.

With regard to the metal oxide film formed as above, visible light absorption property and photo-induced hydrophilic property were evaluated in the same manner as in Embodiment 9 (see FIGS. 16 and 17). The results were much the same as in the case of Embodiment 9.

Comparative Example 1

(a) Producing Coating Liquid

Figure 8:
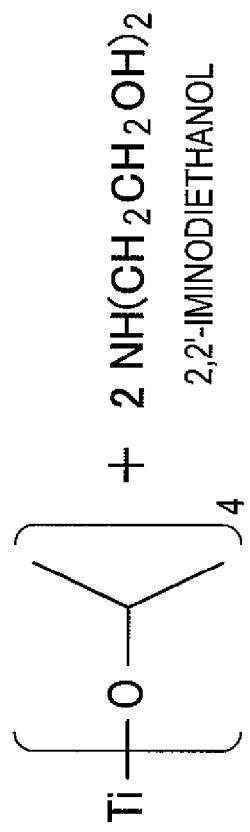
FIG. 8 is an explanatory view showing a molecular structure of a titanium-iminodiethanol complex.
Figure 8:
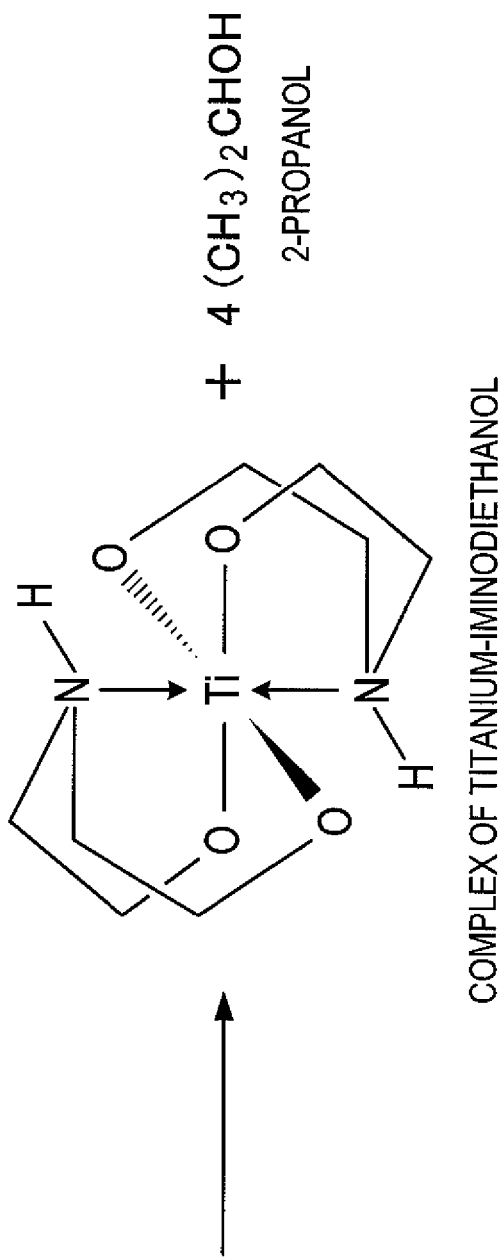

A solution was prepared wherein 2,2'-iminodiethanol (2,2'-iminodiethanol) was dissolved in a suitable amount of toluene. To the solution, titanium(IV) isopropoxide was added so as to obtain a mixed solution. The total amount of the solvent in the mixed solution was adjusted such that the concentration of titanium(IV) isopropoxide became 0.5 M. The above-described mixed solution was refluxed approximately for 1 hour, and then distilled until the temperature of steam became 110° C. and the amount of the mixed solution became half. Thereafter, benzene was added in the proportion of 1 ml to 1 ml of the above-described mixed solution. Then, the coating liquid was completed. The coating liquid is a solution of titanium 2,2'-iminodiethoxide (complex of titanium-iminodiethanol). The molecular structure of titanium 2,2'-iminodiethoxide is shown in FIG. 8.

(b) Forming a Metal Oxide Film on the Surface of a Glass Base Plate

The coating liquid produced in the above-described (a) was applied onto the surface of a glass base plate (a PYREX (registered trademark) glass in the size of 50 mm×50 mm) by the spin coat method (approximately 0.5 ml was added at 1000 rpm for 30 seconds). Subsequently, the glass base plate was fired under the above-described 500° C. condition.

(c) Evaluation of the Metal Oxide Film

Figure 9:
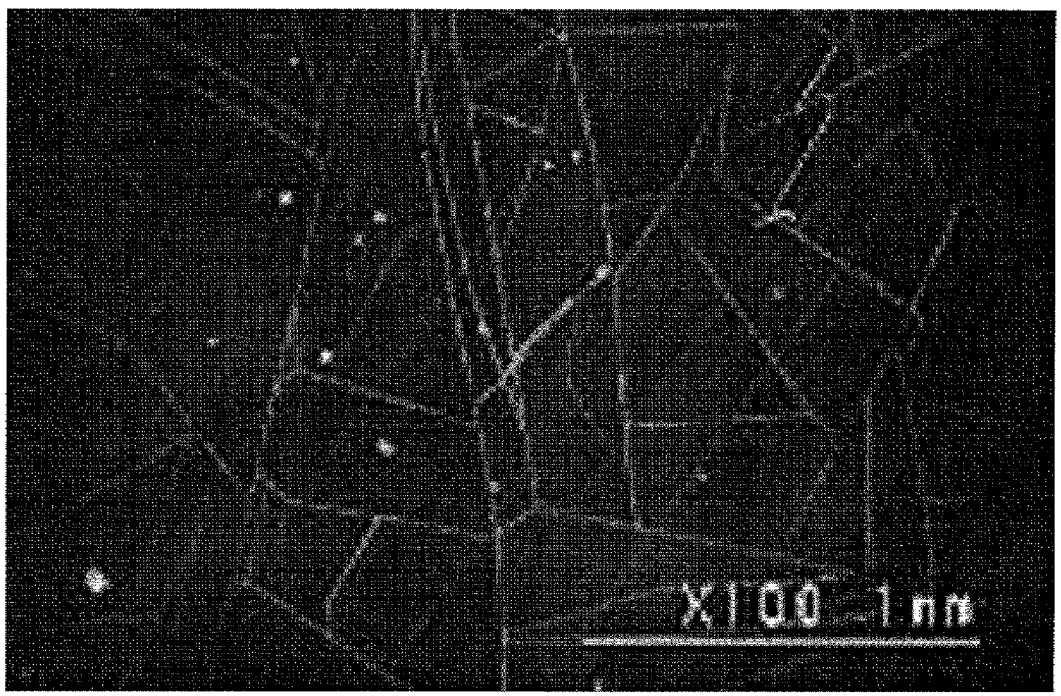
FIG. 9 is a microscope image showing a surface of a metal oxide film.

The metal oxide film formed in the above-described (b) was observed by an optical microscope. FIG. 9 is a microscope image of the surface of the metal oxide film. As shown in FIG. 9, a number of cracks were formed on the surface of the metal oxide film.

The reason is assumed as follows. That is, titanium 2,2'-iminodiethoxide contained in the coating liquid of Comparative Example 1 has a three-dimensional structure having a metal in the center as shown in FIG. 3. Consequently, when a film, made of titanium 2,2'-iminodiethoxide, is fired, and the ligands are lost by thermal decomposition, a large contraction in the volume in three-dimensional space is caused. As a result, cracks are caused.

Comparative Example 2

(a) Producing Coating Liquid 1 wt % of TNS (titania nanosheet) aqueous suspension was diluted by ethanol to 0.25 wt %. Ultrasonic irradiation was then performed for 5 minutes to the diluted suspension. The coating liquid was completed.

(b) Forming Metal Oxide Films on Surfaces of Glass Base Plates

The coating liquid produced in the above-described (a) was applied onto the surface of each glass base plate (a PYREX (registered trademark) glass in the size of 50 mm×50 mm) by the spin coat method (approximately 0.5 ml was added at 1000 rpm for 30 seconds). Subsequently, each glass base plate was fired under the above-described 250° C., 300° C. or 350° C. conditions.

(c) Evaluation of the Metal Oxide Films

Hardness of each metal oxide film formed in the above-described (b) was measured. The results are shown in the above Table 1. As shown in Table 1, hardness of each metal oxide film formed in Comparative Example 2 was 6B or lower in any of the firing conditions of 250° C., 300° C. and 350° C. Conditions for measuring hardness are the same as the measuring conditions in Embodiment 1.

With regard to each metal oxide film formed in the above-described (b), a contact angle of water was measured. The measurement results are shown in above Table 3.

As shown in above Table 3, even in the case of the firing conditions of 300° C. or 350° C., the contact angle after 3-hour irradiation was 4.9°, which is comparable with the contact angle achieved in Embodiment 1.

Comparative Example 3

(a) Producing Coating Liquid

Aluminum s-butoxide (aluminum(III) sec-butoxide) and a suitable amount of benzene were mixed to prepare a solution 1. 2,2'-iminodiethanol was dissolved in a suitable amount of benzene to prepare a solution 2. The solution 1 was added to the solution 2 as much as the mol ratio of aluminum s-butoxide and 2,2'-iminodiethanol became 2:3. The total amount of the solvent in the mixed solution was adjusted such that the concentration of aluminum s-butoxide became 0.1 M. The above-described mixed solution was refluxed approximately for 1 hour, and then distilled approximately for 1 hour until the temperature became 110° C. and half of the solvent was vaporized. Thereafter, benzene was added so as to adjust the concentration of aluminum to 0.05 M. Then, the coating liquid was completed. The coating liquid is a solution of 2,2'-iminodiethanol complex of aluminum.

(b) Forming a Metal Oxide Film on the Surface of a Silicon Wafer Substrate

The coating liquid produced in the above-described (a) was applied onto the surface of a silicon wafer substrate by the spin coat method (at 1000 rpm for 30 seconds). Subsequently, the silicon wafer substrate was fired under the above-described 500° C. condition.

(c) Evaluation of the Metal Oxide Film

After the coating liquid was applied by the spin coat method in the above-described (b), the surface of the silicon wafer substrate was observed. The surface was uniformly finished.

Figure 10:
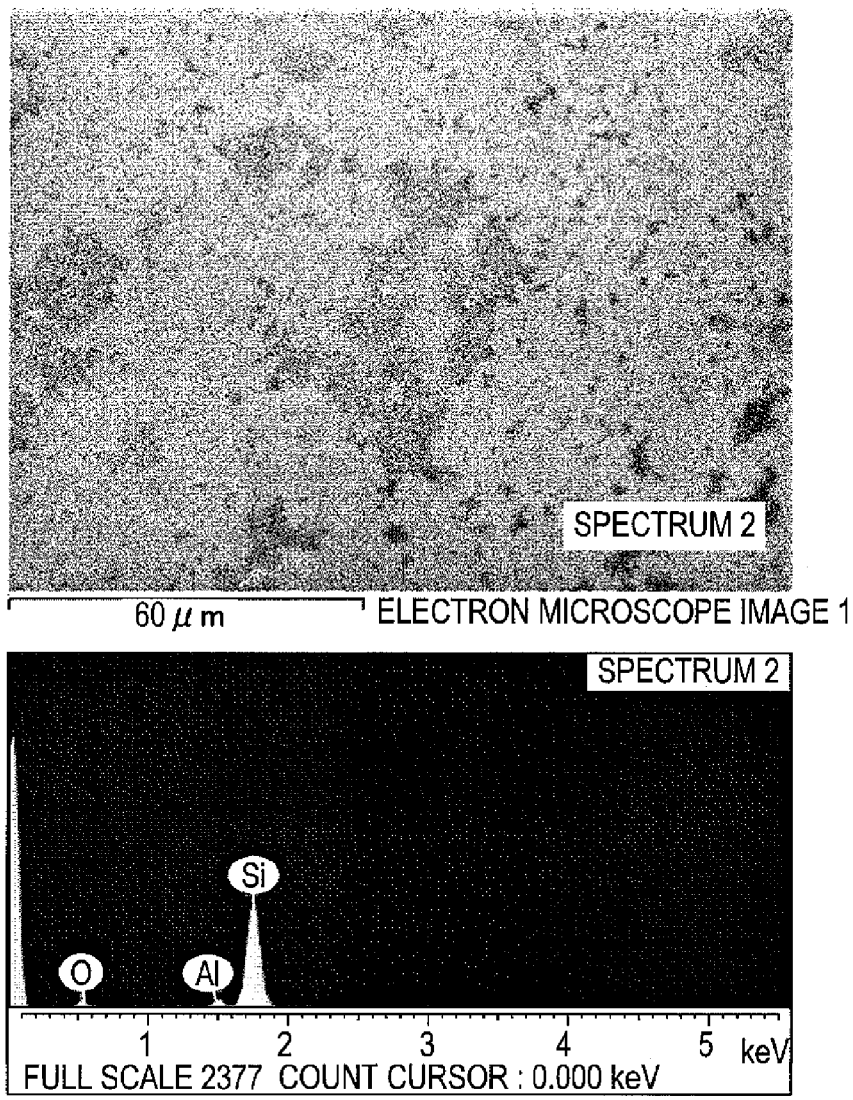
FIG. 10 is a SEM image showing the surface of the metal oxide film, and a chart showing elemental analysis results.
Figure 11:
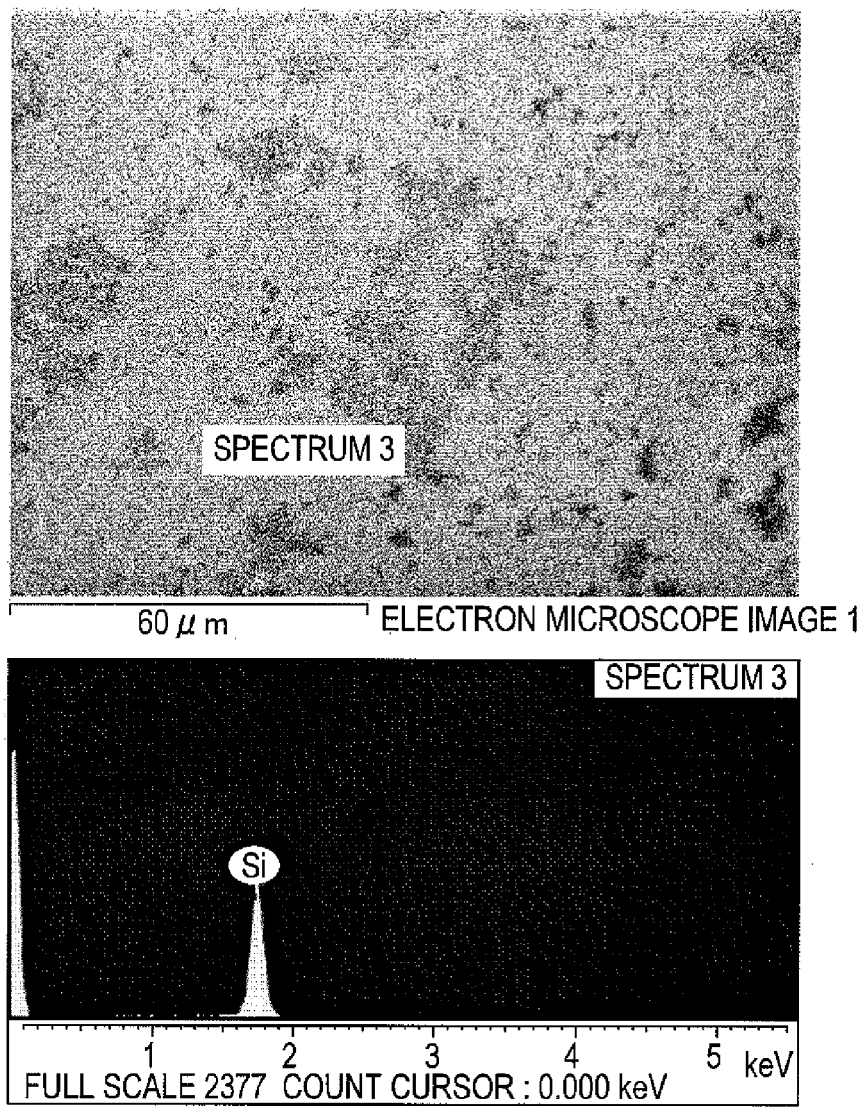
FIG. 11 is a SEM image showing the surface of the metal oxide film, and a chart showing elemental analysis results.
Figure 12:
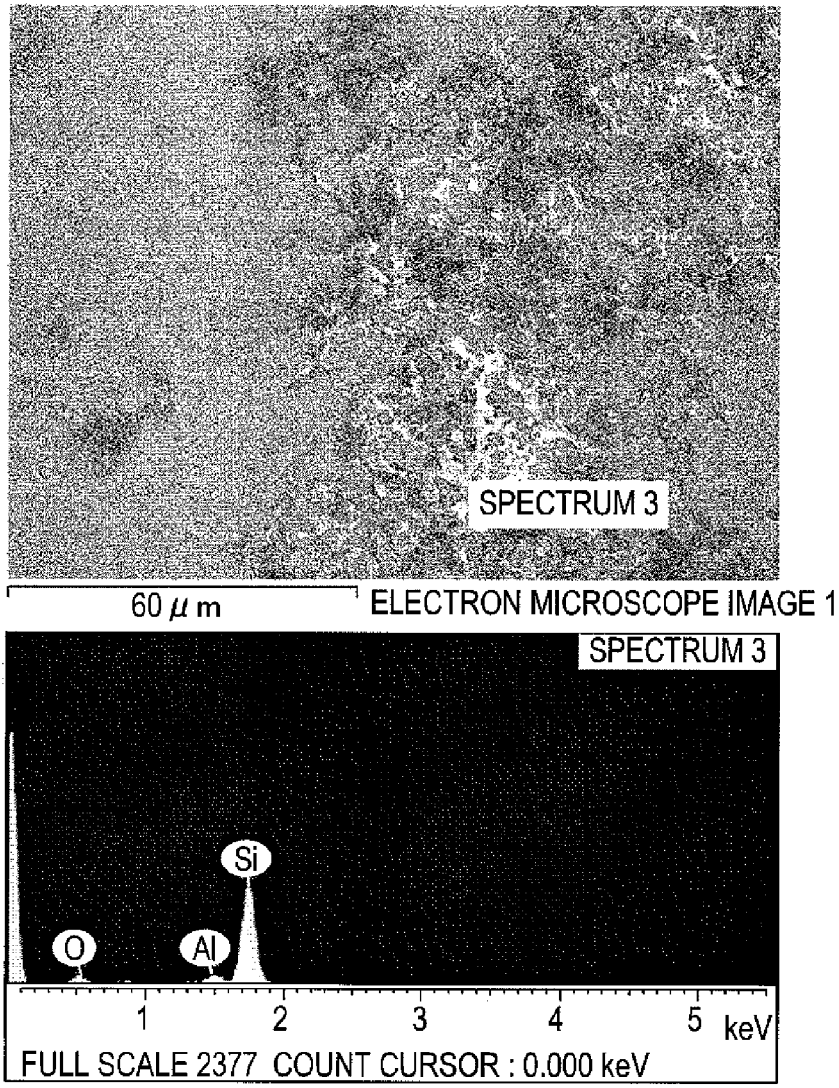
FIG. 12 is a SEM image showing the surface of the metal oxide film, and a chart showing elemental analysis results.
Figure 13:
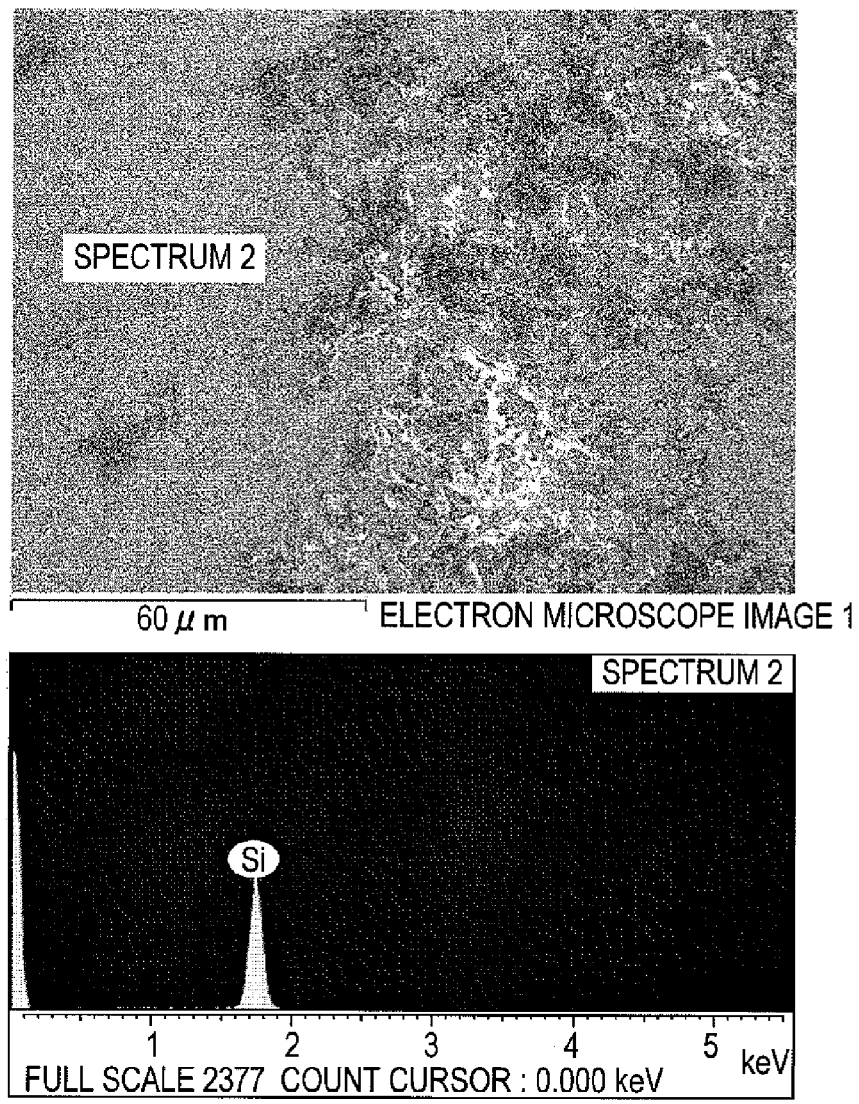
FIG. 13 is a SEM image showing the surface of the metal oxide film, and a chart showing elemental analysis results.

Additionally, after the firing in the above-described (b), the surface of the silicon wafer substrate was observed by a SEM. At the same time, elemental analysis was performed by energy dispersive X-ray spectroscopy (EDAX). The upper images of FIGS. 10-13 show the observed SEM images (FIGS. 10 and 11 are SEM images of the same location. FIGS. 12 and 13 are SEM images of the same location). The SEM images of FIGS. 10 and 11 include both a portion which looks white and a portion which looks black. The SEM images of FIGS. 12 and 13 include an area that visually looks different on a scale of several tens of μm.

In the SEM image of FIG. 10, a portion labeled as SPECTRUM 2 is the portion which looks black. When elemental analysis of this portion was conducted, Si of the silicon wafer substrate and Al of the metal oxide film were detected (the middle and the lower parts of FIG. 10). In the SEM image of FIG. 11, a portion labeled as SPECTRUM 3 is the portion which looks white. When elemental analysis of this portion was conducted, Si of the silicon wafer substrate was detected (the middle and the lower parts of FIG. 11). In the SEM image of FIG. 12, when elemental analysis of an area labeled as SPECTRUM 3 was conducted, Si of the silicon wafer substrate and Al of the metal oxide film were detected (the middle and the lower parts of FIG. 12). In the SEM image of FIG. 13, when elemental analysis of an area labeled as SPECTRUM 2 was conducted, Si of the silicon wafer substrate was detected (the middle and the lower parts of FIG. 13).

As noted above, in view of the microscopic scale, not only there is a portion where Al is not detected (portion appearing white) (results of elemental analysis of FIG. 11) but also there is a relatively broad area where Al is not detected (results of elemental analysis of FIG. 13). From these results, it was found that the $Al_2O_3$ oxide film formed on the silicon wafer substrate is extremely nonuniform.

Comparative Example 4

(a) Producing Coating Liquid

A solution was prepared wherein 2,2'-iminodiethanol was dissolved in a suitable amount of xylene. To the solution, ethoxide orthosillicate (TEOS-Tetraethyl Orthosillicate) was added as much as the mol ratio of ethoxide orthosillicate and 2,2'-iminodiethanol became 1:2 so as to obtain a mixed solution. The total amount of the solvent in the mixed solution was adjusted such that the concentration of ethoxide orthosillicate became 0.1 M. The above-described mixed solution was refluxed approximately for 1 hour, and then distilled until the temperature of steam became 140° C. and half of the solvent was vaporized. Thereafter, xylene was added so as to adjust the concentration of silicon to 0.05 M. Then, the coating liquid was completed. The coating liquid is a solution of 2,2'-iminodiethanol complex of silicon.

(b) Forming a Metal Oxide Film on the Surface of an Aluminum Base Plate

The coating liquid produced in the above-described (a) was applied onto the surface of an aluminum base plate by the spin coat method (at 1000 rpm for 30 seconds). Subsequently, the aluminum base plate was fired under the above-described 500° C. condition.

(c) Evaluation of the Metal Oxide Film

After the coating liquid was applied by the spin coat method in the above-described (b), the surface of the aluminum base plate was observed. The surface was uniformly finished.

Figure 14:
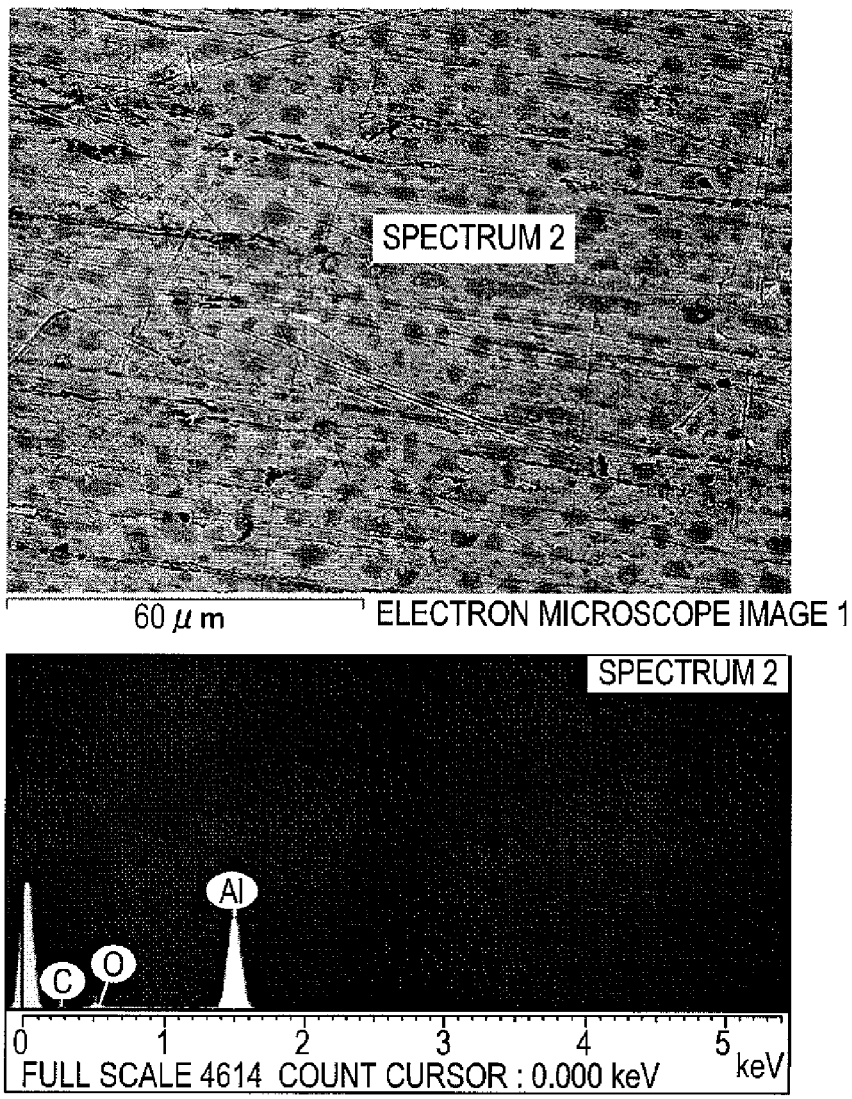
FIG. 14 is a SEM image showing the surface of the metal oxide film, and a chart showing elemental analysis results.
Figure 15:
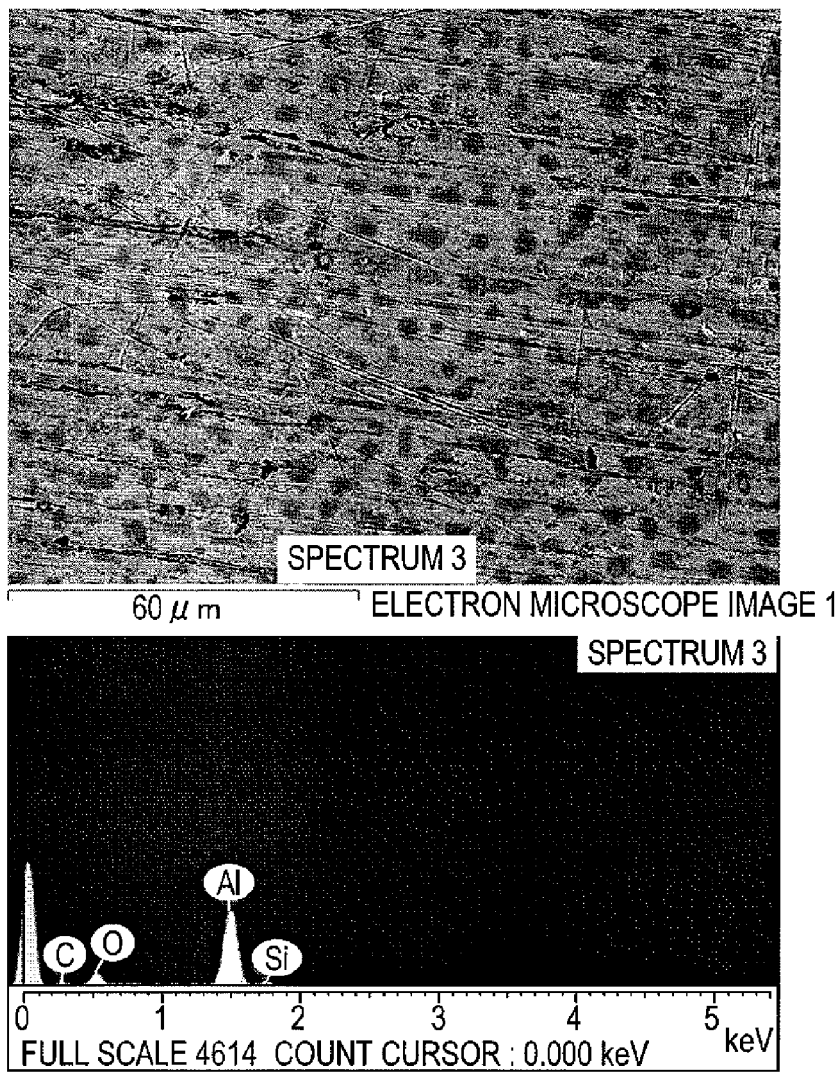
FIG. 15 is a SEM image showing the surface of the metal oxide film, and a chart showing elemental analysis results.

Additionally, after the firing in the above-described (b), the surface of the aluminum base plate was observed by a SEM. At the same time, elemental analysis was performed by energy dispersive X-ray spectroscopy (EDAX). The upper images of FIGS. 14 and 15 show the observed SEM images. These SEM images include both a portion which looks white and a portion which looks black. In the SEM image of FIG. 14, a portion labeled as SPECTRUM 2 is the portion which looks white. When elemental analysis of this portion was conducted, Al of the aluminum base plate was detected (the middle and the lower parts of FIG. 14). In the SEM image of FIG. 15, a portion labeled as SPECTRUM 2 is the portion which looks black. When elemental analysis of this portion was conducted, Al of the aluminum base plate and Si derived from Si oxide were detected (the middle and the lower parts of FIG. 15).

From the above results, it was found there are both the portion where Si oxide film is not formed (portion which looks white in the SEM image) and the portion where Si oxide film is formed (portion which looks black in the SEM image), and that the Si oxide film is nonuniform.

Comparative Example 5

(a) Producing Coating Liquid

A solution was prepared wherein diethanolamine was dissolved in a suitable amount of xylene. To the solution, germanium(IV) propoxide (Germanium(IV) propoxide) was added as much as the mol ratio of germanium(IV) propoxide and diethanolamine became 1:2 so as to obtain a mixed solution. The total amount of the solvent in the mixed solution was adjusted such that the concentration of germanium(IV) propoxide became 0.1 M. The above-described mixed solution was refluxed approximately for 1 hour, and then distilled until the temperature of steam became 140° C. and half of the solvent was vaporized. Thereafter, xylene was added so as to adjust the concentration of germanium to 0.05 M. Then, the coating liquid was completed. The coating liquid is a solution of 2,2'-iminodiethanol complex of germanium. The coating liquid turned into a gel and was unable to be applied to the base plate.

It is to be noted that the present invention is not limited to the above-described embodiments, and that the present invention can be carried out in various ways without departing from the scope of the invention.

For instance, the metal complex in each of the above-described embodiments, or the coating liquid including the same, may be produced in the following manners. Use of these metal complexes, or coating liquids, has much the same effect as that in each of the embodiments.

(1) Titanium Catecholate (Molecular Weight: 264)

A solution of catechol (22.0 g, 200 mmol) and toluene (220 ml) was dehydrated by distilling 20 mL of the solution. Thereafter, 28.4 g (100 mmol) of titanium(IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-titanium complex) was brown in color. The yield amount was 26.0 g (98.5 mmol), and the yield percentage was 98%. 2.64 g of catechol-titanium complex was dissolved into 100 mL of 1:4 acetylacetone/toluene to produce a coating liquid.

(2) Titanium Naphthalene-2,3-Dioxide (Molecular Weight: 366)

A solution of 2,3-dihydroxynaphthalene (32.0 g, 200 mmol) and toluene (220 ml) was dehydrated by distilling 20 mL of the solution. Thereafter, 28.4 g (100 mmol) of titanium (IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (2,3-dihydroxynaphthalene-titanium complex) was brown in color. The yield amount was 36.2 g (98.9 mmol), and the yield percentage was 99%. 3.66 g of 2,3-dihydroxynaphthalene-titanium complex was dissolved into 100 mL of 1:4 acetylacetone/toluene to produce a coating liquid.

(3) Titanium Cyanocatecholate (Molecular Weight: 314)

A solution of 3,4-dihydroxybenzonitrile (5.00 g, 37.0 mmol) and toluene (45 ml) was dehydrated by distilling 5 mL of the solution. Thereafter, 5.25 g (18.5 mmol) of titanium (IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (3,4-dihydroxybenzonitrile-titanium complex) was brown in color. The yield amount was 5.80 g (18.5 mmol), and the yield percentage was 100%. 3.14 g of 3,4-dihydroxybenzonitrile-titanium complex was dissolved into 100 mL of ethanol to produce a coating liquid.

(4) Titanium Carboxycatecholate (Molecular Weight: 352)

A solution of 3,4-dihydroxybenzoic acid (30.8 g, 200 mmol) and toluene (220 ml) was dehydrated by distilling 20 mL of the solution. Thereafter, 28.4 g (100 mmol) of titanium (IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (3,4-dihydroxybenzoic acid-titanium complex) was brown in color. The yield amount was 35.0 g (99.4 mmol), and the yield percentage was 99%. 3.52 g of 3,4-dihydroxybenzoic acid-titanium complex was dissolved into 100 mL of 1:4 acetylacetone/ethyl acetate to produce a coating liquid.

(5) Titanium Nitrocatecholate (Molecular Weight: 354)

A solution of 4-nitrocatechol (10 g, 64.5 mmol) and toluene (220 ml) was dehydrated by distilling 20 mL of the solution. Thereafter, 9.15 g (32.2 mmol) of titanium(IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (4-nitrocatechol-titanium complex) was brown in color. The yield amount was 11.0 g (31.1 mmol), and the yield percentage was 97%. 3.54 g of 4-nitrocatechol-titanium complex was dissolved into 100 mL of 1:4 acetylacetone/toluene to produce a coating liquid.

(6) Titanium Pyridine-2,3-Dioxide (Molecular Weight: 266)

A solution of 2,3-dihydroxy pyridine (22.2 g, 200 mmol) and toluene (220 ml) was dehydrated by distilling 20 mL of the solution. Thereafter, 28.4 g (100 mmol) of titanium(IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (2,3-dihydroxy pyridine-titanium complex) was yellow in color. The yield amount was 26.6 g (100 mmol), and the yield percentage was 100%.

(7) Titanium 1,4-Dioxane-2,3-Dioxide (Molecular Weight: 284)

A solution of 1,4-dioxane-2,3-diol (10.0 g, 83.3 mmol) and toluene (90 ml) was dehydrated by distilling 6 mL of the solution. Thereafter, 11.8 g (41.6 mmol) of titanium(IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (1,4-dioxane-2,3-diol-titanium complex) was brown in color. The yield amount was 12.2 g (35.9 mmol), and the yield percentage was 86%.

(8) Titanium Salicylate (Molecular Weight: 320)

A solution of salicylic acid (27.6 g, 200 mmol) and toluene (220 ml) was dehydrated by distilling 20 mL of the solution. Thereafter, 28.4 g (100 mmol) of titanium(IV) isopropoxide (TTIP) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (salicylic acid-titanium complex) was red in color. The yield amount was 32.0 g (100 mmol), and the yield percentage was 100%. 3.20 g of salicylic acid-titanium complex was dissolved into 100 mL of 1:4 acetylacetone/toluene to produce a coating liquid.

(9) Zirconium Catecholate

A solution of catechol (2.20 g, 20 mmol) and toluene (25 ml) was dehydrated by distilling 5 mL of the solution. Thereafter, 5.00 g (10.6 mmol) of zirconium(IV) isopropoxide was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-zirconium complex) was black in color. The yield amount was 3.07 g (10.0 mmol), and the yield percentage was 100%.

(10) Hafnium Catecholate

A solution of catechol (2.34 g, 2.12 mmol) and toluene (26 ml) was dehydrated by distilling 5 mL of the solution. Thereafter, 5.00 g (10.6 mmol) of hafnium(IV) butoxide was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-hafnium complex) was black in color. The yield amount was 4.18 g (10.6 mmol), and the yield percentage was 100%. Catechol-hafnium complex was dissolved into acetylacetone until saturated, and then filtered to be used as a coating liquid.

(11) Vanadium Catecholate (Molecular Weight: 213)

A solution of catechol (3.30 g, 30 mmol) and xylene (45 ml) was dehydrated by distilling 5 mL of the solution. Thereafter, 6.97 g (20 mmol) of vanadium(III) acetylacetonate was added to the solution while stirring. The mixed solution was refluxed for 1 hour, and then, while the distillation temperature was 132° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-vanadium complex) was black in color. The yield amount was 4.26 g (20.0 mmol), and the yield percentage was 100%. Catechol-vanadium complex was dissolved into acetylacetone until saturated, and then filtered to be used as a coating liquid.

(12) Niobium Catecholate (Molecular Weight: 363)

A solution of catechol (8.64 g, 78.5 mmol) and toluene (70 ml) was dehydrated by distilling 10 mL of the solution. Thereafter, 10.0 g (31.4 mmol) of niobium(V) ethoxide was added to the solution while stirring. The mixed solution was refluxed for 1 hour, and then, while the distillation temperature was 110° C. or higher, distilled until the amount of the solution became half. After the distillation, volatile components of the residual mixed solution were vaporized under reduced pressure by a rotary evaporator. The residual solid content was further heated to 100° C. under vacuum using a vacuum dryer so that the remaining volatile components were completely removed. The solid content (catechol-niobium complex) was brown in color. The yield amount was 11.4 g (31.4 mmol), and the yield percentage was 100%. 3.63 g of catechol-niobium complex was dissolved into 100 mL of 1:4 acetylacetone/toluene to produce a coating liquid.

(13) Tantalum Catecholate (Molecular Weight: 451)

A solution of catechol (5.51 g, 50.0 mmol) and toluene (50 ml) was dehydrated by distilling 10 mL of the solution. Thereafter, 8.13 g (20.0 mmol) of tantalum(V) ethoxide was added to the solution while stirring. The mixed solution was refluxed for 1 hour, and then, while the distillation temperature was 110° C. or higher, distilled until the amount of the solution became half. After the distillation, volatile components of the residual mixed solution were vaporized under reduced pressure by a rotary evaporator. The residual solid content was further heated to 100° C. under vacuum using a vacuum dryer so that the remaining volatile components were completely removed. The solid content (catechol-tantalum complex) was yellow in color. The yield amount was 9.02 g (20.0 mmol), and the yield percentage was 100%. 4.51 g of catechol-tantalum complex was dissolved into 100 mL of 1:4 acetylacetone/toluene to produce a coating liquid.

(14) Molybdenum Catecholate (Dioxy) (Molecular Weight: 236)

A solution of catechol (1.10 g, 10 mmol) and xylene (25 ml) was dehydrated by distilling 5 mL of the solution. Thereafter, 3.26 g (10 mmol) of dioxymolybdenum(IV)bisacetylacetonate was added to the solution while stirring. The mixed solution was refluxed for 1 hour, and then, while the distillation temperature was 132° C. or higher, distilled until the amount of the solution became half. After the distillation, volatile components of the residual mixed solution were vaporized under reduced pressure by a rotary evaporator. The residual solid content was further heated to 100° C. under vacuum using a vacuum dryer so that the remaining volatile components were completely removed. The solid content (catechol-molybdenum complex) was black in color. The yield amount was 3.26 g (10.0 mmol), and the yield percentage was 100%. Catechol-molybdenum complex was dissolved into ethanol until saturated, and then filtered to be used as a coating liquid.

(15) Tungsten Catecholate (Molecular Weight: 400)

Catechol (2.20 g, 20 mmol) was blended with a solution of xylene (60 ml) and 2-proponol (20 ml). Thereafter, 3.26 g (10 mmol) of tungsten chloride(IV) was added to the solution while stirring. The mixed solution was refluxed for 1 hour, and then distilled until the amount of the solution became 10 mL. After the distillation, solid content of the product was isolated by suction filtering using a membrane suction filter. The residual solid content was heated to 100° C. under vacuum using a vacuum dryer so that remaining volatile components were completely removed. The solid content (catechol-tungsten complex) was black in color. The yield amount was 4.00 g (10.0 mmol), and the yield percentage was 100%. Catechol-tungsten complex was dissolved into acetylacetone until saturated, and then filtered to be used as a coating liquid.

(16) Manganese Catecholate (Molecular Weight: 163)

A solution of catechol (2.20 g, 20 mmol) and xylene (45 ml) was dehydrated by distilling 5 mL of the solution. Thereafter, 3.46 g (20 mmol) of manganese acetate(II) was added to the solution while stirring. The mixed solution was refluxed for 1 hour, and then, while the distillation temperature was 132° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-manganese complex) was green in color. The yield amount was 3.26 g (20.0 mmol), and the yield percentage was 100%. Catechol-manganese complex was dissolved into acetylacetone until saturated to be used as a coating liquid.

(17) Iron Catecholate (Molecular Weight: 164)

A solution of catechol (2.20 g, 20 mmol) and xylene (45 ml) was dehydrated by distilling 5 mL of the solution. Thereafter, 3.48 g (20 mmol) of iron acetate(II) was added to the solution while stirring. The mixed solution was refluxed for 1 hour, and then, while the distillation temperature was 132° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-iron complex) was orange or brown in color. The yield amount was 3.28 g (20.0 mmol), and the yield percentage was 100%. Catechol-iron complex was dissolved into acetylacetone until saturated, and then filtered to be used as a coating liquid.

(18) Cobalt Catecholate (Molecular Weight: 167)

A solution of catechol (2.20 g, 20 mmol) and xylene (45 ml) was dehydrated by distilling 5 mL of the solution. Thereafter, 3.54 g (20 mmol) of cobalt acetate(II) was added to the solution while stirring. The mixed solution was refluxed for 1 hour, and then, while the distillation temperature was 132° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-cobalt complex) was green in color. The yield amount was 3.34 g (20.0 mmol), and the yield percentage was 100%. Catechol-cobalt complex was dissolved into acetylacetone until saturated, and then filtered to be used as a coating liquid.

(19) Copper Catecholate (Molecular Weight: 171.6)

A solution of catechol (2.20 g, 20 mmol) and toluene (45 ml) was dehydrated by distilling 5 mL of the solution. Thereafter, 2.50 g (20 mmol) of copper(II) methoxide was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-copper complex) was purple in color. The yield amount was 3.30 g (19.2 mmol), and the yield percentage was 96%. Catechol-copper complex was dissolved into acetylacetone until saturated, and then filtered to be used as a coating liquid.

(20) Zinc Catecholate (Molecular Weight: 173)

A solution of catechol (2.20 g, 20 mmol) and xylene (45 ml) was dehydrated by distilling 5 mL of the solution. Thereafter, 3.76 g (20 mmol) of zinc acetate(II) was added to the solution while stirring. The mixed solution was refluxed for 1 hour, and then, while the distillation temperature was 132° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-zinc complex) was white in color. The yield amount was 3.46 g (20.0 mmol), and the yield percentage was 100%.

Catechol-zinc complex was dissolved into acetylacetone until saturated, and then filtered to be used as a coating liquid.

(21) Aluminum Catecholate (Molecular Weight: 189)

A solution of catechol (3.30 g, 30.0 mmol) and toluene (45 ml) was dehydrated by distilling 5 mL of the solution. Thereafter, 4.08 g (20.0 mmol) of aluminum(III) isopropoxide was added to the solution while stirring. The mixed solution was refluxed for 1 hour, and then, while the distillation temperature was 100° C. or higher, distilled until the amount of the solution became half. After the distillation, volatile components of the residual mixed solution were vaporized under reduced pressure by a rotary evaporator. The residual solid content was further heated to 100° C. under vacuum using a vacuum dryer so that the remaining volatile components were completely removed. The solid content (catechol-aluminum complex) was green in color. The yield amount was 3.78 g (20.0 mmol), and the yield percentage was 100%. 1.89 g of catechol-aluminum complex was dissolved into 100 mL of 1:4 acetylacetone/toluene to produce a coating liquid.

(22) Gallium(III) Catecholate (Molecular Weight: 232)

A solution of catechol (1.65 g, 15 mmol) and xylene (25 ml) was dehydrated by distilling 5 mL of the solution. Thereafter, 3.67 g (10 mmol) of galium(III) acetylacetonate was added to the solution while stirring. The mixed solution was refluxed for 1 hour, and then, while the distillation temperature was 132° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-gallium complex) was gray in color. The yield amount was 2.32 g (10.0 mmol), and the yield percentage was 100%. Catechol-gallium complex was dissolved into acetylacetone until saturated, and then filtered to be used as a coating liquid.

(23) Indium(III) Catecholate (Molecular Weight: 277)

A solution of catechol (3.30 g, 30 mmol) and xylene (90 ml) was dehydrated by distilling 10 mL of the solution. Thereafter, 5.84 g (20 mmol) of indium acetate was added to the solution while stirring. The mixed solution was refluxed for 1 hour, and then, while the distillation temperature was 132° C. or higher, distilled until the amount of the solution became half. After the distillation, volatile components of the residual mixed solution were vaporized under reduced pressure by a rotary evaporator. The residual solid content was further heated to 100° C. under vacuum using a vacuum dryer so that the remaining volatile components were completely removed. The solid content (catechol-indium complex) was green in color. The yield amount was 5.54 g (20 mmol), and the yield percentage was 100%. 6.93 g of catechol-indium complex was dissolved into 100 mL of 1:4 acetylacetone/toluene to produce a coating liquid.

(24) Silicon(IV) Catecholate (Molecular Weight: 244)

A solution of catechol (22.0 g, 0.20 mmol) and toluene (220 mL) was dehydrated by distilling 20 mL of the solution. Thereafter, 20.8 g (0.10 mmol) of tetraethoxysilane (TEOS) was added to the solution while stirring. The mixed solution was refluxed for 1 hour, and then, while the distillation temperature was 100° C. or higher, distilled at a liquid flow rate of 15 mL/h until the amount of the solution became 100 mL. As a result, catechol-silicon complex toluene was obtained. To 2 mL of catechol-silicon complex toluene, 2 mL of acetylacetone was added to produce a coating liquid.

(25) Silicon(IV) Carbonylcatecholate (Molecular Weight: 300)

A solution of 3,4-dihydroxybenzaldehyde (27.6 g, 200 mmol) and toluene (220 mL) was dehydrated by distilling 5 mL of the solution. Thereafter, 20.8 g (100 mmol) of tetraethoxysilane (TEOS) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (3,4-dihydroxybenzaldehyde-silicon complex) was black in color. The yield amount was 30.0 g (100 mmol), and the yield percentage was 100%. 15 g of 3,4-dihydroxybenzaldehyde-silicon complex was dissolved into 100 mL of 1:9 dimethylsulfoxide/ethanol to produce a coating liquid.

(26) Germanium Catecholate (288.6)

A solution of catechol (2.20 g, 20 mmol) and toluene (25 ml) was dehydrated by distilling 5 mL of the solution. Thereafter, 3.09 g (10.0 mmol) of germanium(IV) isopropoxide was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-germanium complex) was gray in color. The yield amount was 2.89 g (10.0 mmol), and the yield percentage was 100%. Catechol-germanium complex was dissolved into acetylacetone until saturated, and then filtered to be used as a coating liquid.

(27) Tin Catecholate (Molecular Weight: 335)

A solution of catechol (2.20 g, 20.0 mmol) and toluene (25 ml) was dehydrated by distilling 5 mL of the solution. Thereafter, 4.11 g (10.0 mmol) of tin(IV) butoxide was added to the solution while stirring. The mixed solution was refluxed for 1 hour, and then, while the distillation temperature was 100° C. or higher, distilled until the amount of the solution became half. After the distillation, volatile components of the residual mixed solution were vaporized under reduced pressure by a rotary evaporator. The residual solid content was further heated to 100° C. under vacuum using a vacuum dryer so that the remaining volatile components were completely removed. The solid content (catechol-tin complex) was green in color. The yield amount was 3.35 g (10.0 mmol), and the yield percentage was 100%. 6.70 g of catechol-tin complex was dissolved into 100 mL of 1:4 acetylacetone/toluene to produce a coating liquid.

(28) Bismuth Catecholate (Molecular Weight: 371)

A solution of catechol (1.65 g, 15 mmol) and xylene (25 ml) was dehydrated by distilling 5 mL of the solution. Thereafter, 4.70 g (10 mmol) of bismuth(III) pentoxide was added to the solution while stirring. The mixed solution was refluxed for 1 hour, and then, while the distillation temperature was 132° C. or higher, distilled until the amount of the solution became half. After the distillation, volatile components of the residual mixed solution were vaporized under reduced pressure by a rotary evaporator. The residual solid content was further heated to 100° C. under vacuum using a vacuum dryer so that the remaining volatile components were completely removed. The solid content (catechol-bismuth complex) was black in color. The yield amount was 3.71 g (10.0 mmol), and the yield percentage was 100%. Catechol-bismuth complex was dissolved into ethanol until saturated, and then filtered to be used as a coating liquid.

(29) Magnesium Catecholate (Molecular Weight: 132)

A solution of catechol (2.20 g, 20 mmol) and toluene (45 ml) was dehydrated by distilling 5 mL of the solution. Thereafter, 2.29 g (20 mmol) of magnesium(II) ethoxide was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-magnesium complex) was black in color. The yield amount was 2.57 g (19.5 mmol), and the yield percentage was 97%. Catechol-magnesium complex was dissolved into acetylacetone until saturated, and then filtered to be used as a coating liquid.

(30) Barium Catecholate (Molecular Weight: 245)

A solution of catechol (1.37 g, 12.5 mmol) and toluene (25 ml) was dehydrated by distilling 5 mL of the solution. Thereafter, barium(II) isopropoxide (3.20 g (12.5 mmol)) was added to the solution while stirring. The mixed solution was refluxed for 1 hour, and then, while the distillation temperature was 100° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-barium complex) was greenish gray in color. The yield amount was 3.08 g (12.5 mmol), and the yield percentage was 100%. Catechol-barium complex was dissolved into acetylacetone until saturated, and then filtered to be used as a coating liquid.

(31) Europium(III) Catecholate (Molecular Weight: 314)

A solution of catechol (3.30 g, 30 mmol) and xylene (45 ml) was dehydrated by distilling 5 mL of the solution. Thereafter, 6.58 g (20 mmol) of europium acetate was added to the solution while stirring. The mixed solution was refluxed for 1 hour, and then, while the distillation temperature was 132° C. or higher, distilled until the amount of the solution became half. After the distillation, solid content of the product was isolated by suction filtering using a membrane suction filter. The residual solid content was heated to 100° C. under vacuum using a vacuum dryer so that remaining volatile components were completely removed. The solid content (catechol-europium complex) was yellow in color. The yield amount was 6.28 g (20 mmol), and the yield percentage was 100%. 0.314 g of catechol-europium complex was dissolved into 10 mL of acetylacetone/toluene to produce a coating liquid.

The invention claimed is:

1. A coating liquid including one or more of metal complexes including aromatic rings, the one of more metal complexes being selected from a metal complex A represented by Chemical Formula 1, a metal complex B represented by Chemical Formula 2, and a metal complex C represented by Chemical Formula 3,

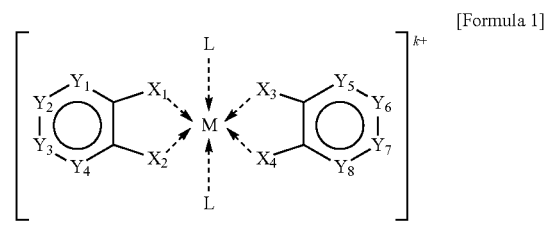

[Formula 1]

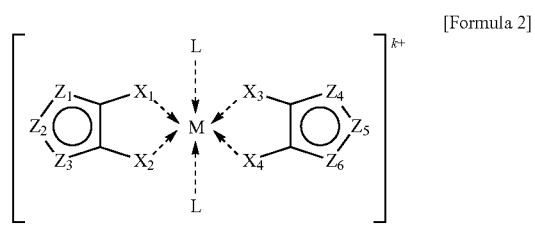

[Formula 2]

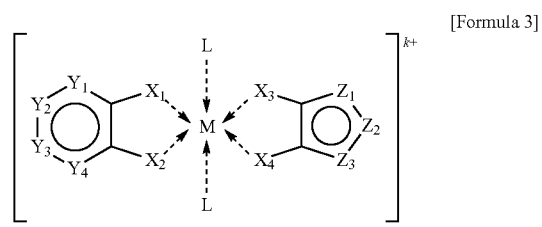

[Formula 3]

wherein M in Chemical Formula 1, Chemical Formula 2 and Chemical Formula 3 represents a metal ion; each of $X_1$-$X_4$ in Chemical Formula 1, Chemical Formula 2 and Chemical Formula 3 is one of O, NH, $CO_2$ and S; each of $Y_1$-$Y_8$ in Chemical Formula 1 and $Y_1$-$Y_4$ in Chemical Formula 3 is either CH or N; each of $Z_1$-$Z_3$ in Chemical Formula 2 and Chemical Formula 3 and $Z_4$-$Z_6$ in Chemical Formula 2 is one selected from a group consisting of O, NH and S, and two selected from a group consisting of CH and N; L in Chemical Formula 1, Chemical Formula 2 and Chemical Formula 3 represents an axial ligand; and k in Chemical Formula 1, Chemical Formula 2 and Chemical Formula 3 represents a valence of each of the metal complexes and is equal to a sum of electric charges of M, $X_1$-$X_4$ and L.

2. The coating liquid according to claim 1 wherein the M is one or more of metal ions selected from a group consisting of Al, Si, Ti, V, Cr, Mn, Fe, Co, Ni, Cu, Zn, Ga, Zr, Nb, In, Sn, Eu, Ta, and Pb.

3. The coating liquid according to claim 1 wherein the metal complex A is one of metal complexes represented by Chemical Formulae 4-11,

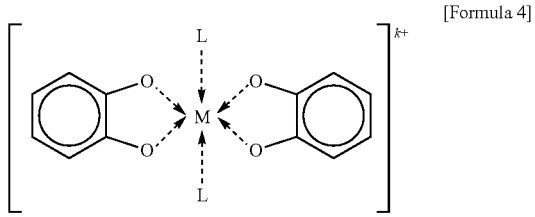

[Formula 4]

[Formula 5]
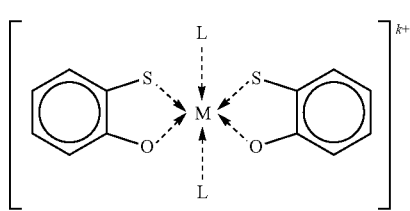

[Formula 6]
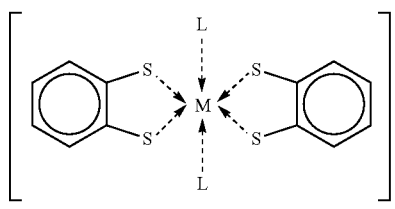

[Formula 7]
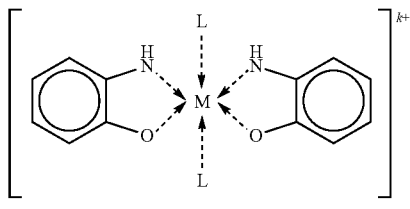

[Formula 8]
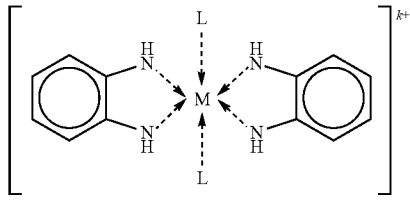

[Formula 9]
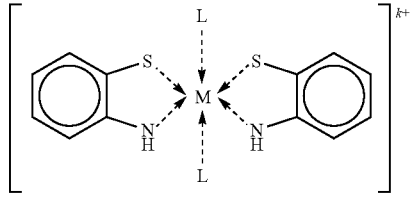

[Formula 10]
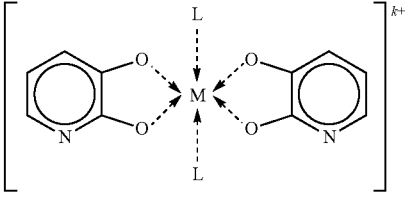

[Formula 11]
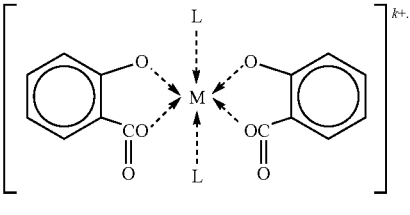

4. The coating liquid according to claim 1 wherein the metal complex B is one of metal complexes represented by Chemical Formulae 12-15,

[Formula 12]
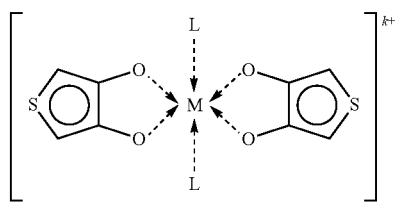

[Formula 13]
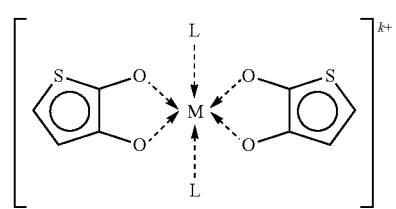

[Formula 14]
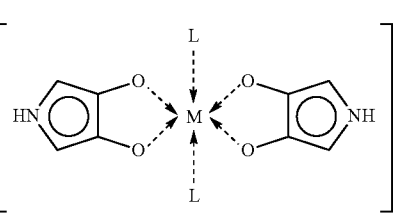

[Formula 15]
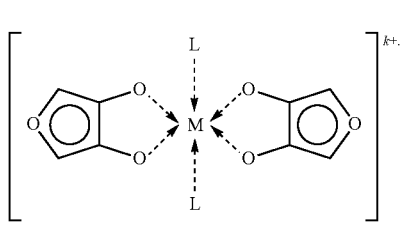

5. The coating liquid according to claim 1 wherein the metal complex C is one of metal complexes represented by Chemical Formulae 16-17,

[Formula 16]
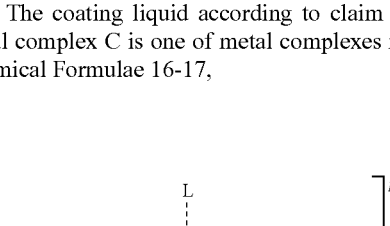

[Formula 17]
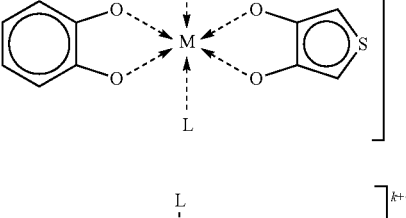

* * * * *